US011102198B2

(12) United States Patent
Kurian

(10) Patent No.: US 11,102,198 B2
(45) Date of Patent: Aug. 24, 2021

(54) PORTABLE SECURITY TOOL FOR USER AUTHENTICATION

(71) Applicant: Bank of America Corporation, Charlotte, NC (US)

(72) Inventor: Manu Jacob Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 142 days.

(21) Appl. No.: 16/688,022

(22) Filed: Nov. 19, 2019

(65) Prior Publication Data

US 2021/0152538 A1  May 20, 2021

(51) Int. Cl.
*H04L 29/06* (2006.01)

(52) U.S. Cl.
CPC ........ *H04L 63/083* (2013.01); *H04L 63/0478* (2013.01); *H04L 63/068* (2013.01); *H04L 63/102* (2013.01); *H04L 63/107* (2013.01)

(58) Field of Classification Search
CPC .. G07C 9/00; G07C 9/00722; G07C 9/00904; G07C 9/257; G07C 9/23; H04L 9/00; H04L 29/06; H04L 63/068; H04L 63/083; H04L 63/102; H04L 63/107; H04L 63/0478; H04L 63/18; H04L 63/0876; H04L 63/0853; H04L 9/14; H04L 9/0863; H04L 9/083; G06F 15/16; G06F 17/30; G06F 21/629; G06F 16/24542; G06F 16/24524; H04K 1/00
See application file for complete search history.

(56) References Cited

U.S. PATENT DOCUMENTS

| 4,511,946 | A | * | 4/1985 | McGahan | .......... G07C 9/00722 340/5.24 |
| 6,817,519 | B2 | * | 11/2004 | Yasushi | ................. H04L 63/083 235/379 |
| 7,281,130 | B2 | | 10/2007 | Johnson et al. | |
| 7,478,418 | B2 | | 1/2009 | Supramaniam et al. | |
| 7,571,471 | B2 | | 8/2009 | Sandhu et al. | |

(Continued)

OTHER PUBLICATIONS

U.S. Appl. No. 16/559,772, filed Sep. 4, 2019, Manu Jacob Kurian.
(Continued)

*Primary Examiner* — Thanhnga B Truong
(74) *Attorney, Agent, or Firm* — Michael A. Springs

(57) ABSTRACT

An apparatus includes a memory, and a processor. During a first mode of operation, the hardware processor obtains a first key and a second key from a first system. The first system includes a first subsystem and a second subsystem. The first key indicates that a user previously accessed the first subsystem and the second key indicates that the user previously accessed the second subsystem. During a second mode of operation, the processor receives a request indicating that the user is seeking to access the second system. The processor then performs an authentication of the user, which includes receiving an authentication string from the user that includes a first user key and a second user key, determining that the first user key matches the first key, and determining that the second user key matches the second key. In response, the processor provides the user with access to the second system.

20 Claims, 9 Drawing Sheets

(56) References Cited

U.S. PATENT DOCUMENTS

| | | |
|---|---|---|
| 7,661,128 B2 | 2/2010 | Chen et al. |
| 7,734,045 B2 | 6/2010 | Sandhu et al. |
| 7,734,911 B2 | 6/2010 | Ganesan et al. |
| 7,805,128 B2 | 9/2010 | Bentley et al. |
| 7,908,645 B2 | 3/2011 | Varghese et al. |
| 8,006,300 B2 | 8/2011 | Mizrah |
| 8,041,954 B2 | 10/2011 | Plesman |
| 8,266,674 B2 | 9/2012 | Huang et al. |
| 8,341,406 B2 | 12/2012 | Hildebrand |
| 8,595,810 B1 | 11/2013 | Ben Ayed |
| 8,769,304 B2 | 7/2014 | Kirsch |
| 8,769,655 B2 | 7/2014 | Gould et al. |
| 8,874,547 B2 * | 10/2014 | Khanolkar ........ G06F 16/24542 707/718 |
| 8,953,786 B2 * | 2/2015 | Ramaswamy ............ H04L 9/14 380/28 |
| 9,064,257 B2 | 6/2015 | Beigi |
| 9,231,948 B1 * | 1/2016 | Gabrielson ............. H04L 63/18 |
| 9,311,472 B2 | 4/2016 | Nguyen et al. |
| 9,402,181 B1 | 7/2016 | Yi et al. |
| 9,432,361 B2 | 8/2016 | Mahaffey et al. |
| 9,444,809 B2 | 9/2016 | Ganesan |
| 9,455,988 B2 | 9/2016 | Oberheide et al. |
| 9,473,485 B2 | 10/2016 | Kendall |
| 9,529,992 B2 | 12/2016 | Hillis |
| 9,763,097 B2 | 9/2017 | Robinson et al. |
| 9,906,520 B2 | 2/2018 | Fouad et al. |
| 10,003,458 B2 | 6/2018 | Ylonen |
| 10,007,780 B1 | 6/2018 | Dhoot et al. |
| 10,027,659 B2 | 7/2018 | Hillis |
| 10,114,935 B2 | 10/2018 | Das et al. |
| 10,212,587 B2 | 2/2019 | Bentley et al. |
| 10,212,591 B1 | 2/2019 | Queru |
| 10,326,775 B2 | 6/2019 | Ford et al. |
| 2005/0033968 A1 | 2/2005 | Dupouy et al. |
| 2006/0206919 A1 | 9/2006 | Montgomery et al. |
| 2006/0212407 A1 | 9/2006 | Lyon |
| 2007/0067618 A1 | 3/2007 | Sandhu et al. |
| 2007/0283159 A1 * | 12/2007 | Borsa ..................... G07C 9/257 713/182 |
| 2008/0005339 A1 | 1/2008 | Kwan et al. |
| 2009/0006846 A1 | 1/2009 | Rosenblatt |
| 2009/0260077 A1 | 10/2009 | Zhu et al. |
| 2011/0026716 A1 | 2/2011 | Tang et al. |
| 2015/0172920 A1 | 6/2015 | Ben Ayed |
| 2015/0215312 A1 | 7/2015 | Cesnik |

OTHER PUBLICATIONS

U.S. Appl. No. 16/559,813, filed Sep. 4, 2019, Manu Jacob Kurian.
Kurian, M. J., "Security Tool," U.S. Appl. No. 16/559,772, filed Sep. 4, 2019, 48 pages.
Kurian, M. J., "Security Tool," U.S. Appl. No. 16/559,813, filed Sep. 4, 2019, 46 pages.

* cited by examiner

PORTABLE SECURITY TOOL FOR USER AUTHENTICATION

TECHNICAL FIELD

This invention relates generally to network security, and specifically to a portable security tool for user authentication.

BACKGROUND

With the recent proliferation of mobile device technology, the rise in cloud computing, and the popularity of work-from-home policies, many organizations have adopted technology policies permitting the use of external devices to access internal company systems, rather than restricting access to company devices connected to the internal network. These policies provide users with the flexibility to choose their preferred access devices as well as the ability to access the internal systems from any location, at any time, potentially increasing both user productivity and user satisfaction.

At the same time, such policies also bring with them increased network security risks. While traditional network security solutions, such as firewalls, anti-virus software, anti-spyware, security patch management, and virtual private networks continue to play a vital role in network protection, they may not be effective against hackers able to gain access to internal networks through the use of compromised user login credentials. Such access may result in the loss of sensitive data, such as trade secrets or consumer information, damage to data and/or equipment, and/or potential legal liability for failure to protect the personal information of the organization's consumers.

SUMMARY

A number of methods exist to help maintain network security while nevertheless providing external access to a network; however, such methods tend to have weaknesses that may easily be exploited. As an example, one of the most widely used and basic forms of network security is the use of usernames and passwords. However, such login credentials may easily be compromised. For example, hackers may gain access to login credentials through: (1) phishing attempts, in which users may be tricked into providing their login credentials by emails and/or websites attempting to imitate communications and/or websites from legitimate sources; (2) the use of malware to capture login credentials through keystroke logging; (3) data and website breaches, in which hackers may gain access to personal information that includes login credentials; (4) interception of login credentials submitted over public Wi-Fi; and/or (5) brute force attempts to systematically discover usernames and passwords.

In comparison to a simple reliance on usernames and passwords, dual/multi-factor authentication methods have recently gained popularity as methods for providing enhanced network security. For example, such methods may rely on a device that the user has in his/her possession, through which the user may receive a verification code that is used to complete the login process. However, even though these methods provide enhanced security (by going a step beyond the simple entry of a username and password) they too are subject to weaknesses. For example, if, during a phishing attempt, a victim enters his/her login credentials into a fake login page, the attacker may forward these credentials to the real login page, thereby triggering the dual factor authentication procedure that prompts the user for the verification code that was sent to his/her device. By capturing this code—entered by the user into the fake page—the attacker gains a complete authentication set for the real page. While this authentication set is typically only useful for a single log-in to the user's account, once the attacker has successfully logged-in to the user's account, he/she may specify a new device to associate with the account (through which the attacker may receive future authentication codes), thereby gaining continued access to the account.

This disclosure contemplates a centrally-located security tool that addresses one or more of the above technical problems. The tool is designed to sit at the edge between an external network and an organization's internal system. When a user seeks access to one or more subsystems of the organization's internal system, the tool launches a virtual host configured to receive the connection request from the user's device, without connecting the device to the internal subsystems and while attempting to isolate the device from the underlying physical resources of the tool (e.g., operating system, files, hardware, etc.). The subsequent behavior of the virtual host depends on the user's previous interactions with the system, if any. For example, if a connection request seeking access to the system represents the user's first attempt to access the system, the virtual host performs a traditional authentication of the user, using the user's login credentials. If the virtual host authenticates the user, the host provides the user with access to the system. The tool then generates a record of the locations within the system accessed by the user during the user's access session (for example, the record may indicate that the user accessed the first subsystem while logged into the system). The tool stores this record in both the internal system and on a device of the user, in the form of one or more alpha-numeric keys. During subsequent log-in attempts by the user, the tool uses the keys, along with the user's login credentials, to authenticate the user. This disclosure contemplates that in certain embodiments, each time the user interacts with the system, the tool updates the alpha-numeric keys, to reflect the additional locations within the system accessed by the user. Accordingly, even if a hacker is able to gain access to a user's set of keys from a given point in time, these keys will likely be of limited use. This is because any subsequent system access by the user will result in a modified set of keys, such that an authentication attempt using the previous set of keys (i.e. the keys obtained by the hacker at the given point in time) will fail.

In certain embodiments, the above-described centrally-located security tool provides enhanced security to an organization's internal network, during normal operating conditions. However, in the event of a natural disaster, or other emergency, networks may go down such that users are not able to authenticate through a centrally located security tool into the organization's internal network. At the same time, the organization may nevertheless wish to permit users to access some of its internal subsystems. For example, while users in a disaster region may be unable to authenticate into a national organization's nation-wide network, the organization may nonetheless wish to permit such users to access subsystems located at a local branch of the organization. However, without the presence of a security tool, such as the one described above, there may be limited safeguards to prevent unauthorized access to those subsystems.

Accordingly, this disclosure also contemplates a portable security tool that may be used in conjunction with the centrally-located security tool. The portable security tool is configured to operate in two different modes. In a first mode of operation, the portable security tool is connected to a first system that includes the centrally-located security tool. The portable security tool is designed to lay essentially dormant, except for periodically syncing with the first system to copy and store the keys generated by the first system. In a second mode of operation, the portable security tool may be disconnected from the first system and connected to a second system. The portable security tool may then be used to authenticate users of the first system into the second system, by ensuring that their security keys match those collected from the first system, and to provide users with access to the second system. Certain embodiments of the portable security tool are described below.

According to one embodiment, an apparatus includes a memory, and a hardware processor communicatively coupled to the memory. During a first mode of operation, the hardware processor obtains a first key and a second key from a first system. The first system includes a first subsystem and a second subsystem. The first key indicates that a user previously accessed the first subsystem and the second key indicates that the user previously accessed the second subsystem. During a second mode of operation, the processor receives a request indicating that the user is seeking to access the second system. During the second mode of operation, the processor also performs an authentication of the user, without yet connecting the user to the second system. Performing the authentication includes receiving an authentication string from the user. The authentication string includes a first user key and a second user key. Performing the authentication also includes determining that the first user key matches the first key. Performing the authentication further includes determining that the second user key matches the second key. In response to performing the authentication of the user, the processor provides the user with access to the second system.

According to another embodiment, a method includes, during a first mode of operation, obtaining a first key and a second key from a first system. The first system includes a first subsystem and a second subsystem. The first key indicates that a user previously accessed the first subsystem and the second key indicates that the user previously accessed the second subsystem. The method also includes, during a second mode of operation, receiving a request indicating that the user is seeking to access the second system. The method additionally includes, during the second mode of operation, performing an authentication of the user, without yet connecting the user to the second system. Performing the authentication includes receiving an authentication string from the user. The authentication string includes a first user key and a second user key. Performing the authentication also includes determining that the first user key matches the first key. Performing the authentication further includes determining that the second user key matches the second key. In response to performing the authentication of the user, the method includes providing the user with access to the second system.

According to a further embodiment, a system includes a first subsystem, a second subsystem, a storage element, and a processing element communicatively coupled to the storage element. The first subsystem includes a first part and a second part. The processing element is operable, during a first mode of operation, to obtain a first key and a second key from the first subsystem. The first key indicates that a user previously accessed the first part of the first subsystem, the second key indicates that the user previously accessed the second part of the first subsystem. The processing element is also operable, during a second mode of operation, to receive a request indicating that the user is seeking to access the second subsystem. The processing element is additionally operable, during the second mode of operation, to perform an authentication of the user, without yet connecting the user to the second subsystem. Performing the authentication includes receiving an authentication string from the user. The authentication string includes a first user key and a second user key. Performing the authentication also includes determining that the first user key matches the first key. Performing the authentication further includes determining that the second user key matches the second key. In response to performing the authentication of the user, the processing element is operable to provide the user with access to the second subsystem.

Certain embodiments provide one or more technical advantages. For example, an embodiment improves the security of a second system, by authenticating users based on login credentials and/or keys associated with the users and obtained from a first system to which the users have previously accessed. As another example, an embodiment prevents a hacker who has gained access to a user's login credentials from impersonating the user and accessing the second system. As a further example, an embodiment authenticates a user, without providing the user's device with access to the second system, and while limiting the exposure of the portable security tool to the user's device. The portable security tool described in the present disclosure may particularly be integrated into a practical application of a portable tool that may be transported to a disaster zone and connected to a system whose normal authentication servers are down. In this manner, portable security tool may be used to authenticate users into the system, rather than simply providing unauthenticated users with access to the system, thereby providing a layer of security to the system.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 4:
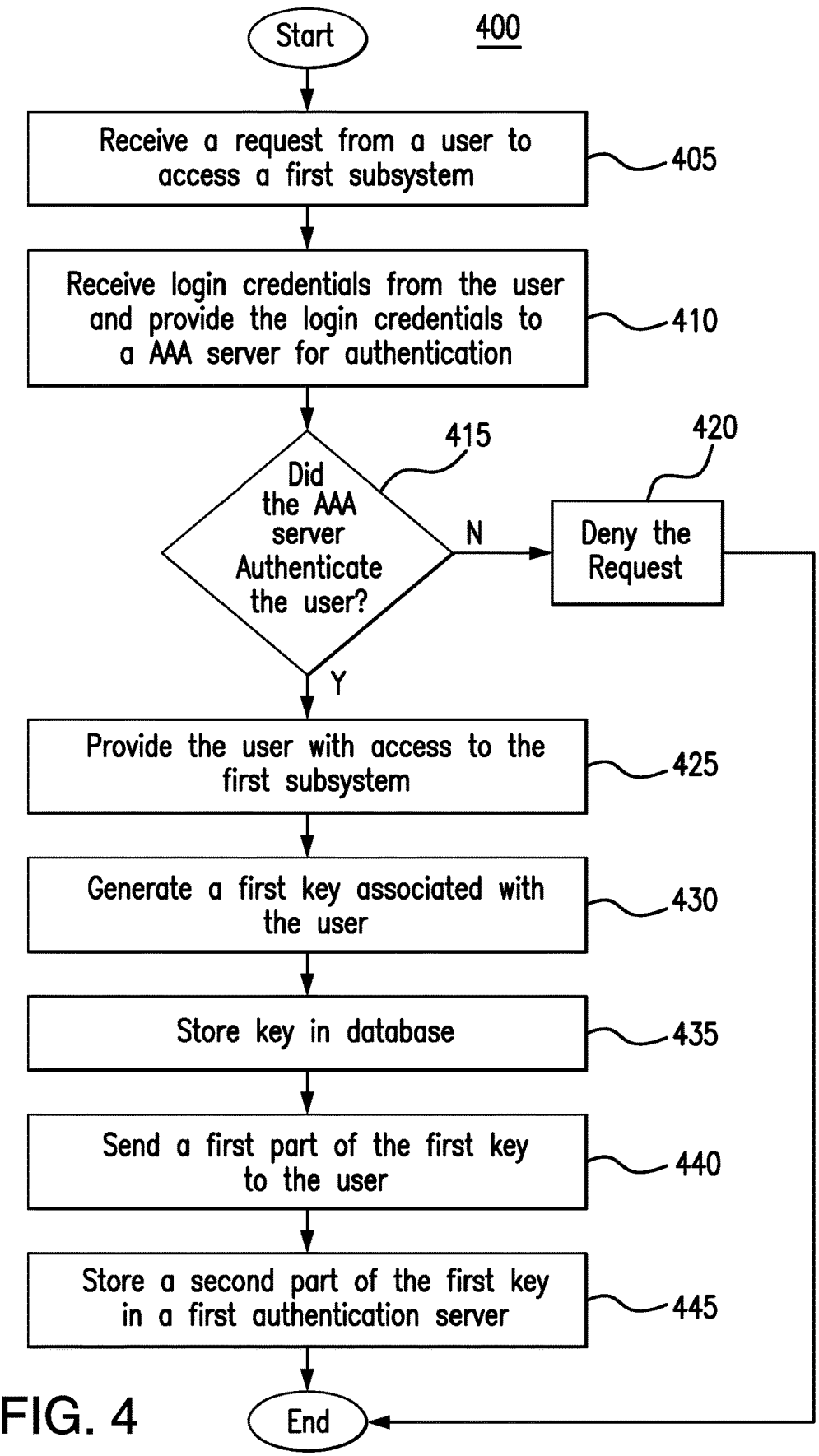
FIG. 4 presents a flowchart illustrating the process by which a given subsystem of the system in FIG. 1 generates a key in response to a user accessing the given subsystem.
Figure 5:
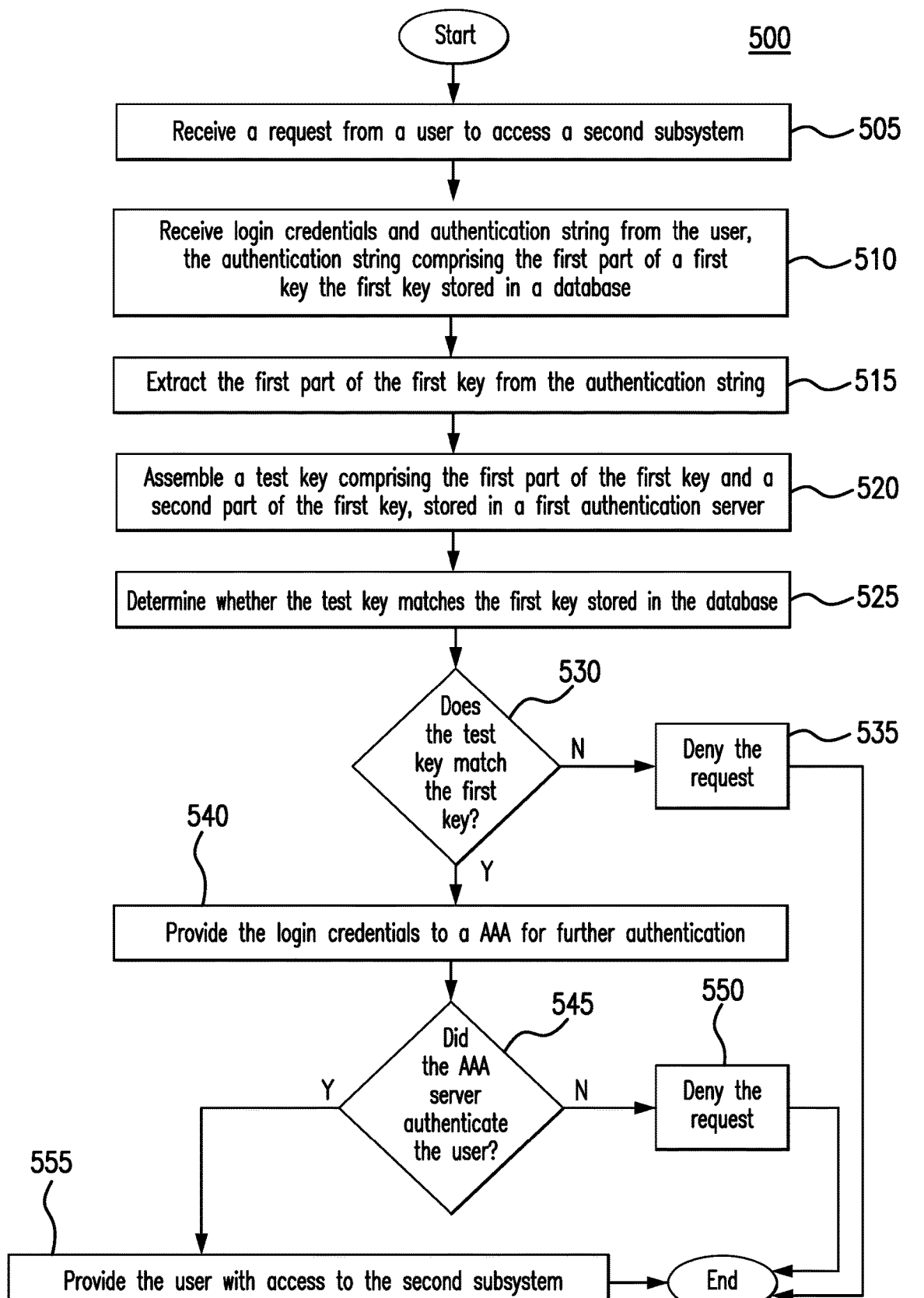
FIG. 5 presents a flowchart illustrating the process by which the security tool system of FIG. 1 authenticates a user based on both the user's login credentials and a key, previously generated in response to the user accessing a subsystem of the system.
Figure 6:
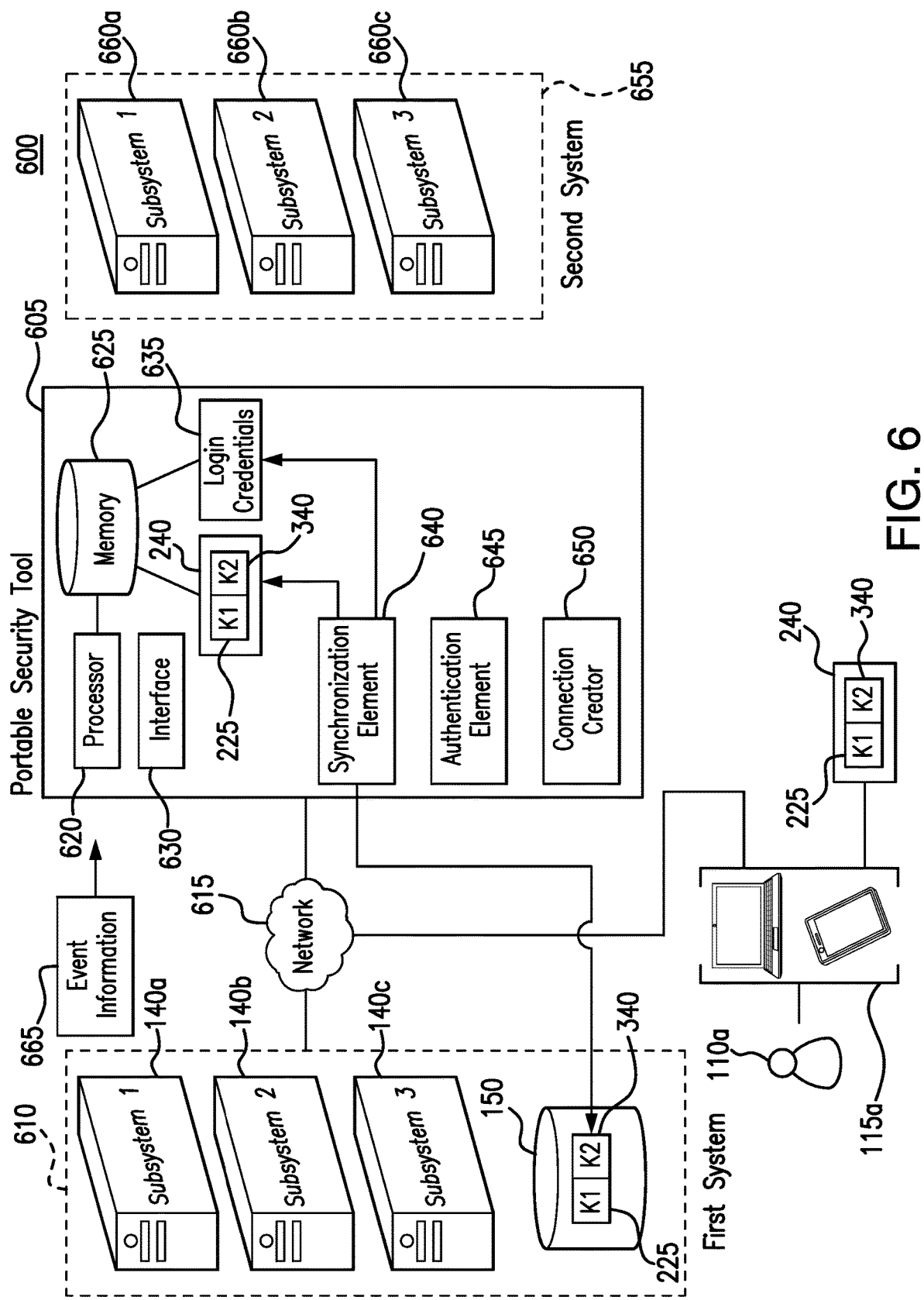
FIG. 6 illustrates an example portable security tool system, in which the portable security tool is connected to a first system and copying users' login credentials and security keys from the first system.
Figure 7:
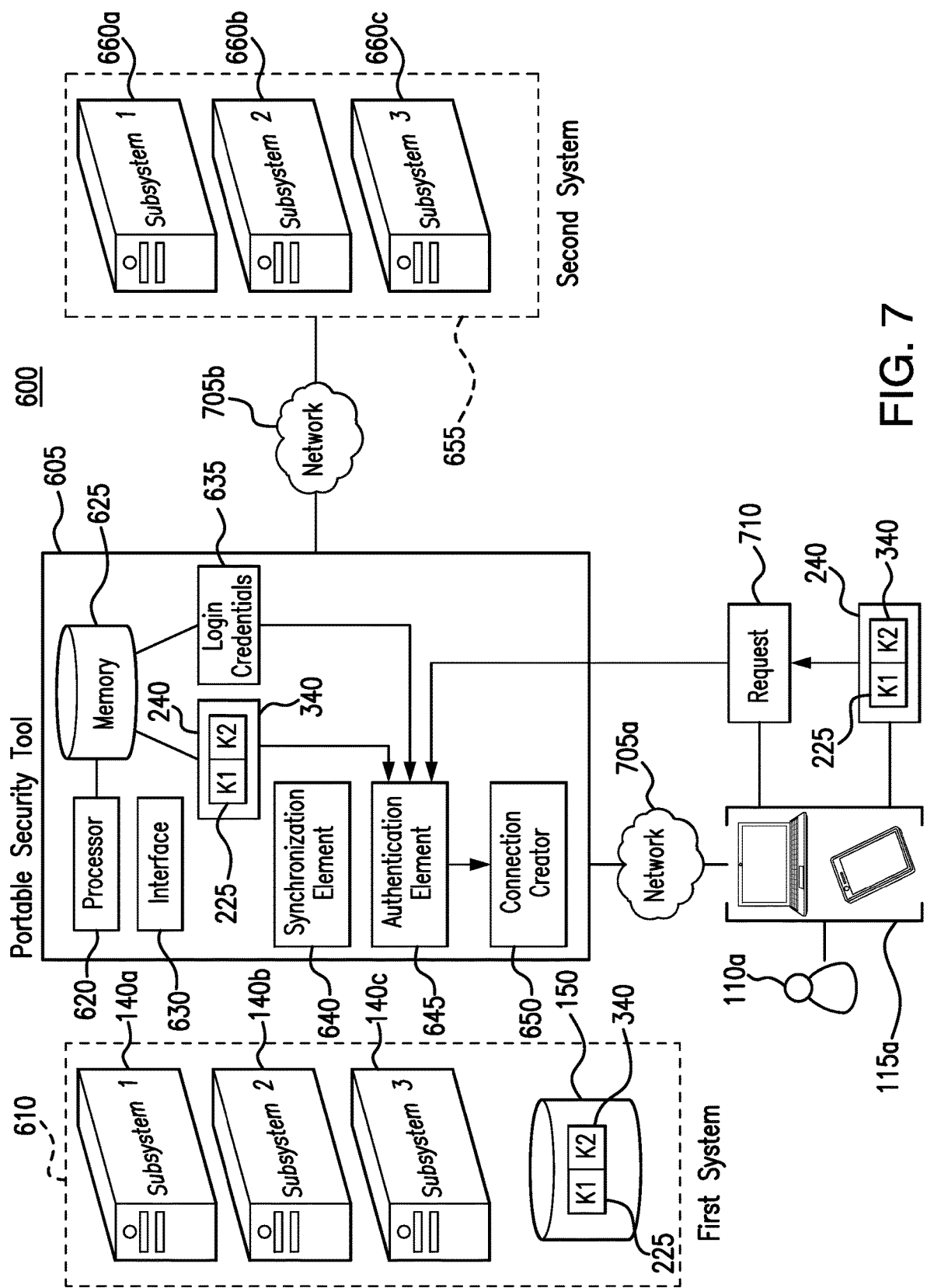
FIG. 7 illustrates an example of the behavior of the portable security tool system of FIG. 6, in response to the portable security tool connecting in which the portable security tool is connected to a second system and providing authentication services to the second system.
Figure 8:
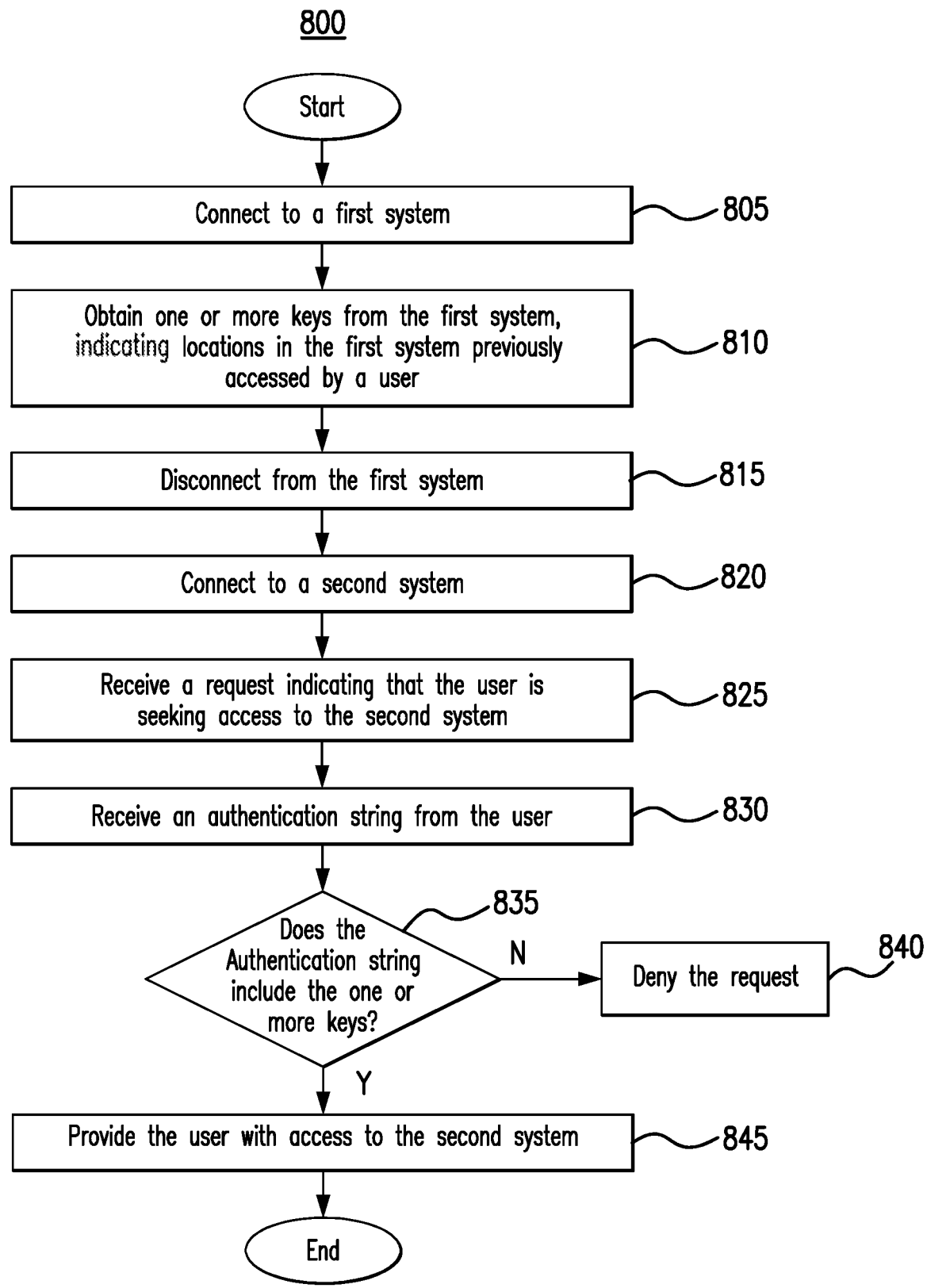
FIG. 8 presents a flowchart illustrating the process by which the portable security tool of FIG. 6 first syncs with a first system, copying users' login credentials and security keys from the first system, and then connects to a second system to provide authentication services to the second system.

Embodiments of the present disclosure and its advantages may be understood by referring to FIGS. 1 through 8 of the drawings, like numerals being used for like and corresponding parts of the various drawings. FIGS. 1 through 5 are used to describe the centrally-located security tool, while FIGS. 6 through 8 are used to describe the portable security tool.

Figure 1:
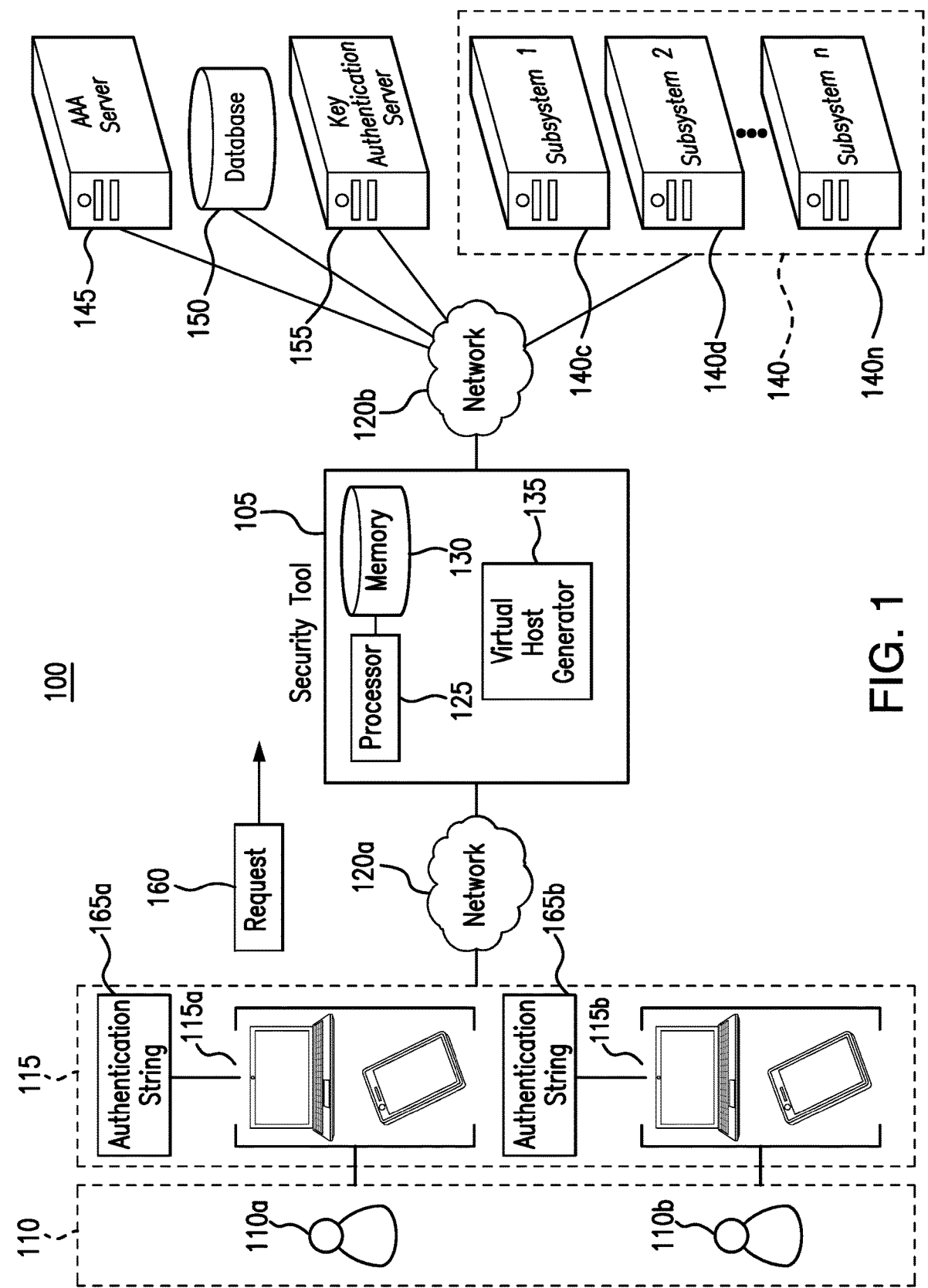
FIG. 1 illustrates an example centrally-located security tool system.

I. Centrally-Located Security Tool a. System Overview FIG. 1 illustrates an example system 100 that includes security tool 105, users 110, devices 115, network 120a, network 120b, subsystems 140a through 140n, first authentication server 145, database 150, and second authentication server 155. Generally, security tool 105 receives connection requests 160 from devices 115, indicating that users 110 are seeking access to one or more subsystems 140a through 140n. For each connection request 160 submitted by device 115a, security tool 105 uses virtual host generator 135 to authenticate user 110a and provide user 110a with access to one or more subsystems of subsystems 140a through 140n.

Devices 115 may be used by users 110 to send connection requests 160, seeking access to internal subsystems 140, to security tool 105. This disclosure contemplates that connection requests 160 may include login credentials (for example, usernames and passwords), as well as authentication strings 165a and 165b. For a given user 110a, authentication string 165a may include a set of keys, as described in further detail below, in the discussion of FIGS. 2 and 3. Devices 115 may also be used by users 110 to send/receive data to/from internal subsystems 140, once access to internal subsystems 140 has been granted.

Devices 115 include any appropriate device for communicating with components of system 100 over network 120a. For example, devices 115 may be a telephone, a mobile phone, a computer, a laptop, a wireless or cellular telephone, a tablet, a server, and IoT device, and/or an automated assistant, among others. This disclosure contemplates devices 115 being any appropriate device for sending and receiving communications over network 120a. Device 115 may also include a user interface, such as a display, a microphone, keypad, or other appropriate terminal equipment usable by user 110a or 110b. In some embodiments, an application executed by device 115 may perform the functions described herein.

Network 120a facilitates communication between and amongst the various components of system 100 located outside of internal network 120b of subsystems 140. This disclosure contemplates network 120a being any suitable network operable to facilitate communication between such components of system 100. Network 120a may include any interconnecting system capable of transmitting audio, video, signals, data, messages, or any combination of the preceding. Network 120a may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Network 120b facilitates communication between and amongst the various components of security tool 105 and internal subsystems 140, first authentication server 145, database 150, and second authentication server 155. This disclosure contemplates network 120b being any suitable network operable to facilitate communication between the components of security tool 105 and subsystems 140, first authentication server 145, database 150, and second authentication server 155. Network 120b may include any interconnecting system capable of transmitting audio, video, signals, data, messages, or any combination of the preceding. Network 120b may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As seen in FIG. 1, security tool 105 includes a processor 125 and a memory 130. This disclosure contemplates processor 125 and memory 130 being configured to perform any of the functions of security tool 105 described herein. Generally, security tool 105 implements virtual host generator 135 to launch one or more virtual hosts, configured to authenticate users 110, as described in further detail below, in the discussion of FIGS. 2 and 3.

Processor 125 is any electronic circuitry, including, but not limited to microprocessors, application specific integrated circuits (ASIC), application specific instruction set processor (ASIP), and/or state machines, that communicatively couples to memory 130 and controls the operation of security tool 105. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of security tool 105 by processing information received from network 120a, network 120b, device(s) 115, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Security tool 105 is connected through network 120b to internal subsystems 140, first authorization server 145, database 150, and second authorization server 155.

Internal subsystems 140 may be located on, or otherwise connected to, internal network 120b. Subsystems 140 may be used to run projects and process requests submitted by users 110. Subsystems 140 may include processors, storage elements, application servers, database servers, file servers, mail servers, print servers, web servers, or any other type of computational resource. A project submitted to subsystems 140 may use one or more subsystems 140a through 140n when executing. When a project uses more than one subsystem 140, communication between those servers used by the project occurs over network 120b. The computational capacity of a given subsystem 140 depends both on its hardware and software specifications.

Different subsystems 140a through 140n may be associated with different levels of user access. For example, a first user 110a may be permitted to access only first subsystem 140a and second subsystem 140b, while a second user 110b may be permitted to access all of subsystems 140a through 140n. In certain embodiments, first subsystem 140a may be associated with a password resetting procedure, such that whenever a user 110 attempts to access subsystems 140 for the first time (for example, with a temporary username and password provided by the system), the user is first directed to first subsystem 140a to change his/her username and/or password.

This disclosure contemplates that subsystems 140a through 140n are configured to generate records of user interactions with the subsystems. For example, in certain embodiments, subsystems 140a through 140n are configured to generate alpha-numeric keys, indicating that given users 110 have accessed the subsystems. Such alpha-numeric keys may be stored by subsystems 140a through 140n in database 150 as well as provided to users 110 for storage in authentication strings 165. The generation of such alpha-numeric keys is described in further detail below, in the discussion of FIGS. 2 and 3B.

First authentication server 145 is configured to authenticate a user 110a, based on authentication string 165a provided by a device 115a of user 110a to security tool 105. This disclosure contemplates that the authentication string provided by device 115a to security tool 105 may be provided through connection request 160 (either the same connection request 160 through which user 110a submits his/her login credentials, or a separate connection request 160). The operation of first authentication server 145 is described in further detail below, in the discussion of FIG. 3A.

Database 150 is configured to store data generated by subsystems 140a through 140n. For example, database 150 may be configured to store alpha-numeric keys, generated by subsystems 140a through 140n, as described in further detail below, in the discussion of FIGS. 2 and 3B. In certain embodiments, database 150 may represent one or more blockchains.

Figure 2:
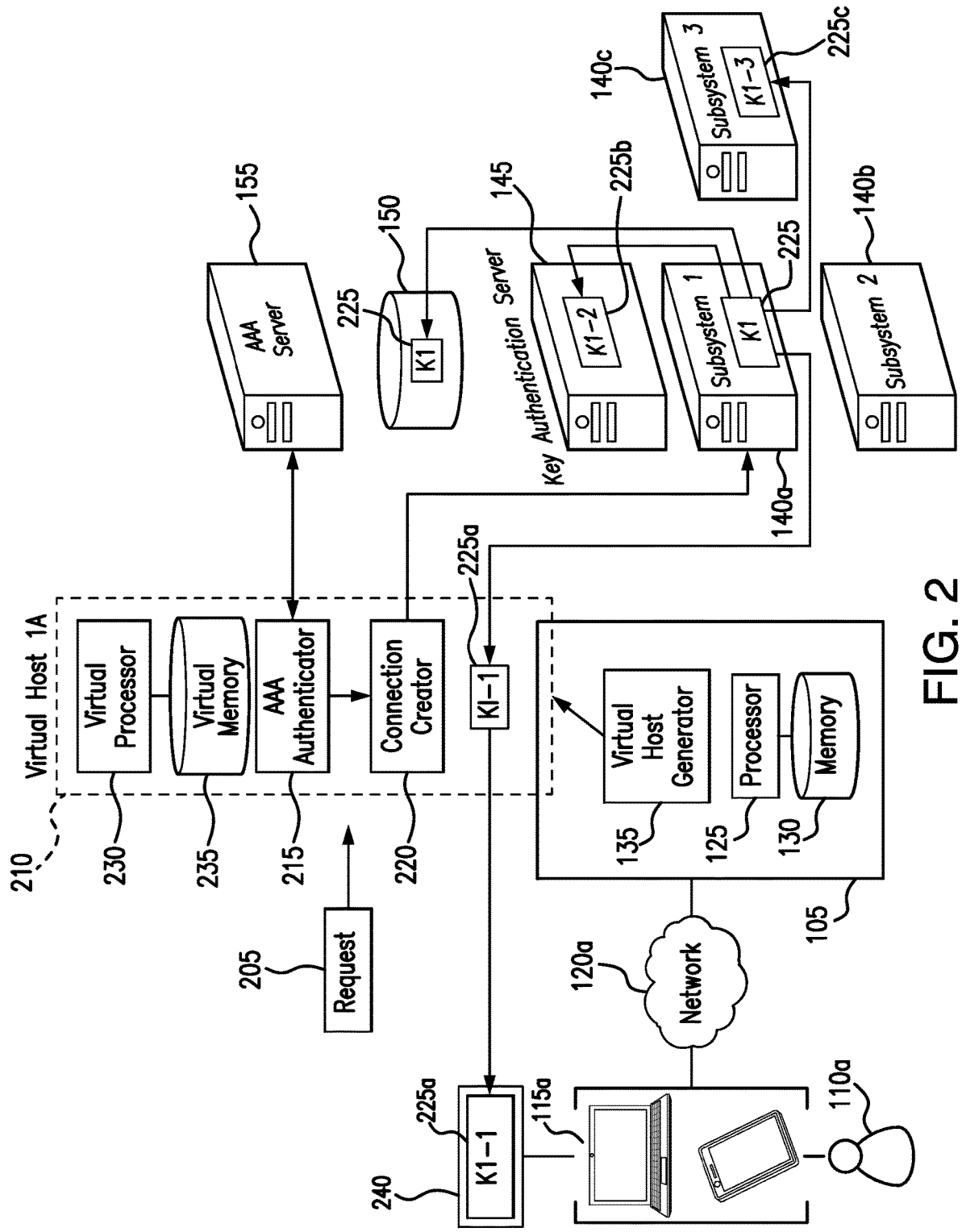
FIG. 2 illustrates an example of the behavior of the security tool system of FIG. 1, in response to a user seeking access to one or more subsystems of the system for the first time.
Figure 3A:
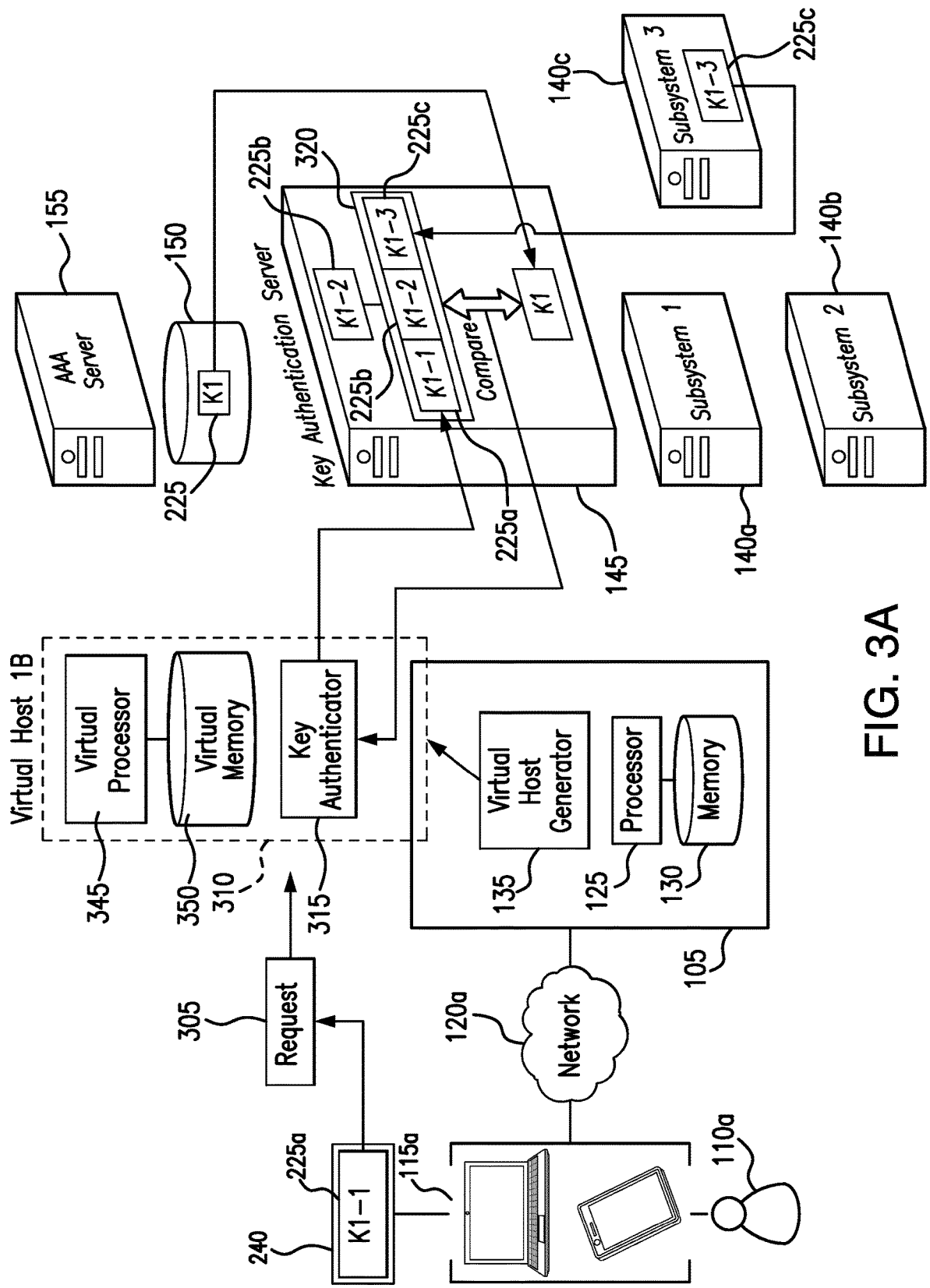
FIGS. 3A and 3B illustrate examples of the behavior of the security tool system of FIG. 1, in response to a user seeking access to a second subsystem of the system, after having previously accessed a first subsystem of the system.
Figure 3B:
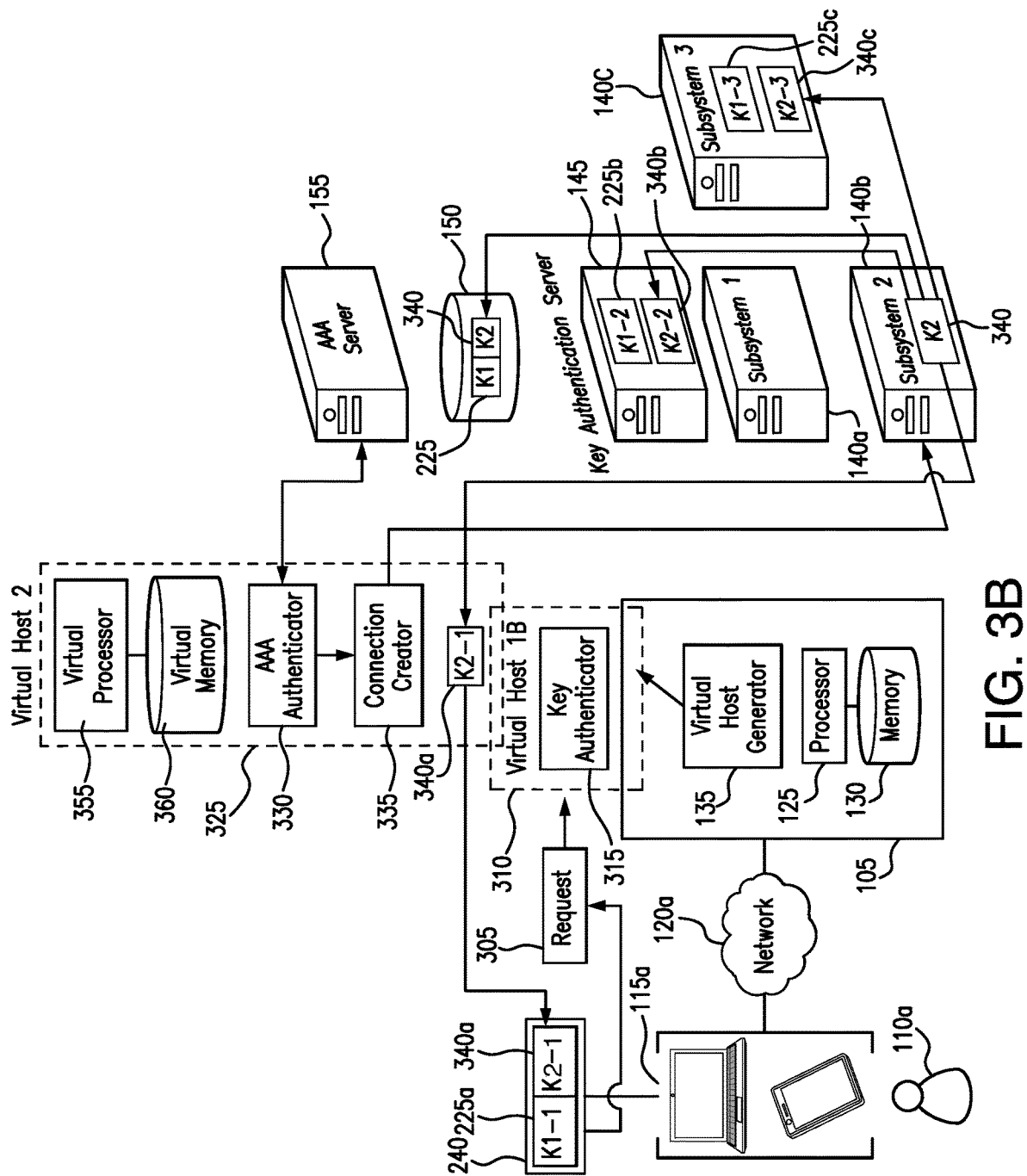

Second authentication server 155 is configured to authenticate a user 110a, based on login credentials provided by user 110a in connection request 160. This disclosure contemplates that second authentication server 155 may be any appropriate authentication server for authenticating users based on login credentials. For example, in certain embodiments, second authentication server 155 may be an authentication, authorization, and accounting (AAA) server. The operation of second authentication server 155 is described in further detail below, in the discussions of FIGS. 2 and 3B.

b. Centrally-Located Security Tool Operation FIGS. 2 and 3 provide additional details illustrating the operation of security tool 105, first authentication server 145, second authentication server 155, and subsystems 140a through 140n, in response to security tool 105 receiving connection requests 160 from users 110 seeking access to subsystems 140. FIG. 2 illustrates the process by which a user who has not yet accessed any of subsystems 140, accesses first subsystem 140a and receives a partial key in response to such access, while FIGS. 3A and 3B illustrate the process by which a user who has previously accessed first subsystem 140a accesses second subsystem 140b.

i. Key Creation

As illustrated in FIG. 2, a user 110a, seeking access to subsystems 140 for the first time, may submit a connection request 205. This disclosure contemplates that connection request 205 may include the login credentials of user 110a. For example, connection request 205 may include a temporary username and password, provided by the system to user 110a and enabling user 110a to log into first subsystem 140a, where user 110a may be prompted to change his/her username and/or password.

Security tool 105 receives connection request 205, indicating that user 110a is seeking access to first subsystem 140a. In response to receiving connection request 205, security tool 105 uses virtual host generator 135 to launch a first virtual host 210. This disclosure contemplates that security tool 105 (and accordingly the virtual hosts generated by virtual host generator 135) is separate from subsystems 140, such that first virtual host 210 may authenticate user 110a, without yet providing device 115a, associated with user 110a, with access to any of subsystems 140a through 140n. The use of virtual hosts may be desirable, because each virtual host may function as a self-contained platform, running its own operating system and software. Accordingly, if a hacker is able to penetrate a virtual host's operating system, such penetration won't necessarily compromise the underlying actual operating system of security tool 105, stored in memory 130 and executed by processor 125. For example, if first virtual host 210 determines that user 110a has failed the authentication process (because his/her login credentials do not match those stored in second authentication server 155), security tool 105 may terminate first virtual host 210, thereby destroying any actions that user 110a may have performed on the virtual operating system.

This disclosure contemplates that the behavior of first virtual host 210, launched by virtual host generator 135 in response to detecting request 205, depends on the previous interactions of user 110a with subsystems 140. FIG. 2 illustrates the operation of virtual host 210 in response to receiving a request 205 from a user 110a who has not yet accessed any of subsystems 140a through 140n, while FIG. 3A illustrates the operation of virtual host 210 in response to receiving a request 305 from a user 110a who has previously accessed at least one of subsystems 140a through 140n.

As illustrated in FIG. 2, the software that first virtual host 210 may run on its own operating system includes traditional authenticator 215 and connection creator 220. This disclosure contemplates that traditional authenticator 215 and connection creator 220 may be software modules stored in virtual memory 235 and executed by virtual processor 230. This disclosure further contemplates that virtual memory 235 and virtual processor 230 are themselves software modules stored in memory 130 and executed by processor 125 An example of the operation of virtual host generator 135, in response to receiving request 205 from user 110a, who has not yet accessed any of subsystems 140a through 140n, is as follows: (1) determine that user 110a has submitted connection request 205 seeking access to one or more subsystems 140a through 140n; and (2) launch first virtual host 210, by generating virtual processor 230 and virtual memory 235, wherein virtual memory 235 stores traditional authenticator 215 and connection creator 220, and first virtual host 210 is configured to execute traditional authenticator 215 and connection creator 220.

Traditional authenticator 215 may receive login credentials from request 205 and send these login credentials to second authentication server 155. Second authentication server 155 may be configured to authenticate user 110a, based on the user's login credentials. This disclosure contemplates that second authentication server 155 may be any appropriate authentication server for authenticating users based on login credentials. For example, in certain embodiments, second authentication server 155 may be an authentication, authorization, and accounting (AAA) server. This disclosure contemplates that second authentication server 155 may maintain an internal record or database of user profiles, each profile storing the username and password for the given user and indicating the subsystems 140a through 140n to which the user is permitted access. Accordingly, when second authentication server 155 receives a connection request 205, including a username and password for user 110a, and indicating that user 110a is seeking access to first subsystem 140a, second authentication server 155 may first determine if the submitted username and password for user 110a match those stored in the profile assigned to user 110a. If the submitted username and password match those stored in user 110a's profile, second authentication server 155 may then determine whether user 110a's profile indicates that user 110a is allowed to access first subsystem 140a. If user 110a's profile indicates that user 110a is in fact permitted to access first subsystem 140a, second authentication server 155 may send a response to first virtual host 210, indicating that second authentication server 155 has authenticated user 110a for access to first subsystem 140a. In response to receiving a response from second authentication server 155 indicating that second authentication server 155 has authenticated user 110a based on the user's login credentials, traditional authenticator 215 may notify connection creator 220 to provide user 110a with access to first subsystem 140a. On the other hand, if second authentication server 155 determines either that the submitted username and password do not match those stored in user 110a's profile, or that user 110a is not permitted to access first subsystem 140a, second authentication server 155 may send a response to first virtual host 210, indicating that second authentication server 155 has failed to authenticate user 110a for access to first subsystem 140a. In response to receiving a response from second authentication server 155 indicating that second authentication server 155 has failed to authenticate user 110a, based on the login credentials provided by user 110a, traditional authenticator 215 may deny connection request 205.

An example of the operation of traditional authenticator 215 is as follows: (1) receive login credentials from user 110a through request 205; (2) send the login credentials to second authentication server 155; (3) receive a response from second authentication server 155 indicating either that second authentication server 155 has authenticated user 110a, or has failed to authenticate user 110a; (4) if the response indicates that second authentication server 155 has authenticated user 110a based on user 110a's login credentials, notify connection creator 220 and request that connection creator 220 provide user 110a with access to first subsystem 140a; (5) if the response indicates that second authentication server 155 has failed to authenticate user 110a based on user 110a's login credentials, deny connection request 205.

As mentioned above, if traditional authenticator 215 determines that second authentication server 155 has authenticated user 110a based on the user's login credentials, traditional authenticator 215 may instruct connection creator 220 to provide user 110a with access to first subsystem 140a. Connection creator 220 is configured to generate a connection between device 115a of user 110a and first subsystem 140a, such that device 115a may access data stored in first subsystem 140a, send data to first subsystem 140a, and/or otherwise interact with first subsystem 140a.

An example of the operation of connection creator 220 is as follows: (1) receive an indication from traditional authenticator 215 that second authentication server has authenticated user 110a for access to first subsystem 140a; (2) determine whether device 115a is attempting to access data stored in first subsystem 140a; (3) if device 115a is attempting to access data stored in first subsystem 140a, allow device 115a to access the data; (4) determine whether device 115a is attempting to send data to first subsystem 140a; (5) if device 115a is attempting to send data to first subsystem 140a, allow device 115a to send data to first subsystem 140a.

In order to provide an extra layer of security to future attempts by user 110a to access subsystems 140, in response to user 110a accessing first subsystem 140a, first subsystem 140a is configured to generate a first key 225 associated with user 110a. This disclosure contemplates that first key 225 stores a record of user 110a's interaction with first subsystem 140a. For example, in certain embodiments, first key 225 indicates that user 110a has accessed first subsystem 140a. This disclosure contemplates that first key 225 stores data indicating that user 110a has accessed first subsystem 140a in any suitable format. For example, in certain embodiments, first key 225 is an alpha-numeric string. As another example, in certain embodiments, first key 225 is a hash value. In certain embodiments, first key 225 is encrypted.

In order to use first key 225 to provide an extra layer of security to future attempts by user 110a to access subsystems 140, this disclosure contemplates that first subsystem 140a stores first key 225 and/or portions of first key 225 in multiple locations. For example, first subsystem 140a stores first key 225 in database 150. In certain embodiments, database 150 may be a blockchain. First subsystem 140a may additionally split first key 225 into a first part 225a and a second part 225b. First subsystem 140a may then send first part 225a of first key 225 to user 110a, for storage in authentication string 240 stored on device 115a. First subsystem 140a may also store second part 225b of first key 225 in first authentication server 145. In certain embodiments, first subsystem 140a may additionally split first key 225 into a third part 225c and store third part 225c in third subsystem 140c. In this manner, first subsystem 140a generates a record of user 110a's access to first subsystem 140a, which security tool 105 may use to further authenticate user 110a, when user 110a seeks to access subsystems 140 in the future; during future access attempts, not only should the login credentials provided by user 110a match the credentials stored in authentication server 155, but authentication string 240, stored on device 115a of user 110a, should also be consistent with first key 225, associated with user 110a and stored in database 150. For a given future access attempt, if either of these conditions is not true, security tool 105 may reject the access attempt. The authentication of user 110a, based on authentication string 240, is described in further detail below, in the discussion of FIGS. 3A and 3B.

In certain embodiments, first subsystem 140a may be configured to generate first key 225 only in response to user 110a accessing first subsystem 140a for the first time. In some embodiments, first subsystem 140a may be configured to generate first key 225 each time user 110a accesses subsystems 140a. In certain such embodiments, subsystem 140a may replace first key 225 stored in database 150 and associated with user 110a's previous access to subsystem 140a with the newly generated first key 225. Additionally, first part 225a of newly generated first key 225 may be sent to user 110a to replace first part 225a of first key 225 associated with user 110a's previous access to subsystem 140a and stored in user 110a's authentication string 240, and second part 225b of newly generated first key 225 may be sent to first authentication server 145 to replace second part 225b of first key 225 associated with user 110a's previous access to subsystem 140a and stored in first authentication server 145. In some embodiments, first subsystem 140a may be configured to modify first key 225 associated with user 110a's previous access to subsystem 140a, to indicate the number of times user 110a has accessed subsystem 140a. For example, if user 110a accesses subsystem 140a for a second time, subsystem 140a may be configured to append the numeral "2" to both first part 225a and second part 225b of first key 225 associated with user 110a's previous access to subsystem 140a, and to correspondingly modify first part 225a of first key 225 stored in user 110a's authentication string 240, second part 225b of first key 225 stored in first authentication server 145, and complete first key 225 stored in database 150.

While FIG. 2 illustrates the behavior of system 100 in response to security tool 105 receiving request 205 from a user 110a who had not previously accessed any of subsystems 140a through 140n, FIGS. 3A and 3B illustrate the behavior of system 100 in response to receiving a subsequent request 305 from user 110a to access second subsystem 140b, following user 110a's previous access to first subsystem 140a.

ii. Key Use

FIG. 3A illustrates the behavior of system 100 prior to providing user 110a with access to second subsystem 140b. As described above, the example presented in FIGS. 3A and 3B contemplates that user 110a has previously accessed first subsystem 140a. Accordingly, an authentication string 240 including first part 225a of first key 225 is stored on a device 115a of user 110a, indicating that user 110a has previously accessed first subsystem 140a. Additionally, first authentication server 145 stores second part 225b of first key 225, and database 150 stores the full first key 225. In certain embodiments, third subsystem 140c may additionally store a third part 225c of first key 225.

As illustrated in FIG. 3A, request 305 indicates that user 110a is seeking access to second subsystem 140b. In certain embodiments, request 305 may contain both user 110a's login credentials and authentication string 240. In some embodiments, user 110a may submit multiple requests 305 to security tool 105. For example, a first request 305 may include user 110a's authentication string 240, while a second request 305 may include user 110a's login credentials. Security tool 105 receives request 305. In response to receiving connection request 305, security tool 105 uses virtual host generator 135 to launch a first virtual host 310. This disclosure contemplates that first virtual host 310 may operate as a self-contained platform, running its own operating system and software, and is configured to authenticate user 110a, without connecting any of user 110a's devices 115a to subsystems 140. Accordingly, if a hacker is able to penetrate a virtual host's operating system, such penetration won't necessarily compromise the underlying actual operating system of security tool 105, stored in memory 130 and executed by processor 125. For example, if first virtual host 310 determines that user 110a has failed the authentication process, security tool 105 may terminate first virtual host 310, thereby destroying any actions that user 110a may have performed on the virtual operating system.

As illustrated in FIG. 3A, the software that first virtual host 310 may run on its own operating system includes key authenticator 315. Key authenticator 315 may be a software module stored in virtual memory 350 and executed by virtual processor 345. This disclosure further contemplates that virtual memory 350 and virtual processor 345 are themselves software modules stored in memory 130 and executed by processor 125. This disclosure contemplates that first virtual host 310 runs key authenticator 315 in response to receiving a request 305 from a user 110a who has previously accessed at least one of subsystems 140a through 140n. An example of the operation of virtual host generator 135, in response to receiving request 305 from user 110a, who has previously accessed at least one of subsystems 140a through 140n, is as follows: (1) determine that user 110a has submitted connection request 305 seeking access to one or more subsystems 140a through 140n; and (2) launch first virtual host 310, by generating virtual processor 345 and virtual memory 350, wherein virtual memory 350 stores key authenticator 315, and first virtual host 310 is configured to execute key authenticator 315.

Key authenticator 315 may receive authentication string 240 from request 305, including first part 225a of first key 225. In certain embodiments, key authenticator 315 may send the full authentication string 240 to first authentication server 145. In some embodiments, key authenticator 315 may extract first part 225a of first key 225 from authentication string 240 and send first part 225a of first key 225 to first authentication server 145.

In response to receiving first part 225a of first key 225 from key authenticator 315 (either separately, or as part of authentication string 240), first authentication server 145 is configured to authenticate user 110a, based on first part 225a of first key 225. In certain embodiments in which first authentication server 145 receives authentication string 240 from key authenticator 315, first authentication server 145 may extract first part 225a of first key 225 from authentication string 240. In some embodiments, first authentication server 145 may receive first part 225a of first key 225 directly from key authenticator 315. First authentication server 145 may then combine first part 225a of first key 225 with second part 225b of first key 225, stored in first authentication server 145, to form a test key 320. In certain embodiments, first authentication server 145 may additionally combine third part 225c of first key 225 with first part 225a and second part 225b of first key 225, to form test key 320. First authentication server 145 may then compare test key 320 to first key 225 stored in database 150. If test key 320 matches first key 225 stored in database 150, first authentication server 145 may send a response to key authenticator 315 indicating that first authentication server 145 has authenticated user 110a, based on first key 225.

While FIG. 3A illustrates an example in which authentication string 240 contains one partial key 225a, this disclosure contemplates that first authentication server 145 may be configured to authenticate user 110a, based on any number of partial keys 225a stored in authentication string 240. For example, in certain embodiments, first authentication server 145 may be configured to receive authentication string 240 from key authenticator 315 and authenticate user 110a based on each of the partial keys 225 stored in authentication string 240. In certain such embodiments, authenticating user 110a based on each of the keys 225 may include extracting the first parts 225a of the keys from authentication string 240, combining the first parts 225a of the keys with second parts 225b of the keys stored in first authentication server 145 to form test keys 320, and comparing the test keys 320 with the full keys 225 stored in database 150. If the test keys 320 match the keys 225 stored in database 150, first authentication server 145 may send a response to first virtual host 310 indicating that it has authenticated user 110a, based on the keys.

As another example, in some embodiments, first virtual host 310 may be configured to authenticate user 110a based on first key 225, and then launch additional virtual hosts 310 to authenticate user 110a based on any other keys 225 stored in authentication string 240. In certain such embodiments, first virtual host 310 may extract the first part 225a of the first key and send first part 225a of the first key to first authentication server 145, to authenticate user 110a based on first key 225. Authenticating user 110a based on first key 225 may include combining first part 225a of the first key with second part 225b of the first key to form test key 320, and comparing test key 320 with first key 225 stored in database 150. If test key 320 matches first key 225 stored in database 150, first authentication server 145 may send a response to first virtual host 310 indicating that it has authenticated user 110a based on first key 225. If authentication string 240 includes a first part 225a of a second key, first virtual host 310 may launch a second virtual host 310 configured to extract the first part 225a of the second key and send the first part 225a of the second key to first authentication server 145, to authenticate user 110a based on the second key 225. This process may repeat for each first part 225a of a key stored in authentication string 240. For example, if authentication string 240 includes N first parts 225a of keys, authentication of user 110a based on the keys may conclude when an N-th virtual host 310 has extracted the first part 225a of the N-th key, sent the first part 225a of the N-th key to first authentication server 145 for authentication, and received a response indicating that first authentication server 145 has authenticated user 110a based on the N-th key.

Once key authenticator 315 has received a response from first authentication server 145, indicating that first authentication server 145 has authenticated user 110a based on first key 225, key authenticator 315 may then launch a second virtual host, as described in further detail below, in the discussion of FIG. 3B, to authenticate user 110a based on user 110a's login credentials. On the other hand, if test key 320 does not match first key 225 stored in database 150, first authentication server 145 may send a response to key authenticator 315 indicating that first authentication server 145 has failed to authenticate user 110a, based on first key 225. Key authenticator 315 may then deny request 305. In response to key authenticator 315 denying request 305, security tool 105 may terminate first virtual host 310.

An example of the operation of key authenticator 315 in response to receiving a request 305 from a user 110a who has previously accessed first subsystem 140a is as follows: (1) receive authentication string 240 from request 305, including first part 225a of first key 225; (2) send authentication string 240 to first authentication server 145; (3) receive a response from first authentication server 145 indicating whether first authentication server 145 has authenticated user 110a based on first key 225; (4a) if the response indicates that first authentication server 145 authenticated user 110a based on first key 225, launch a second virtual host; (4b) if the response indicates that first authentication server 145 failed to authenticate user 110a based on first key 225, deny request 305.

FIG. 3B illustrates the behavior of security tool 105 in response to first authentication server 145 authenticating user 110a, based on first key 225. As described above, in the discussion of FIG. 3A, in response to receiving a response from first authentication server 145 indicating that first authentication server 145 has authenticated first user 110a based on first key 225, key authenticator 315 may launch a second virtual host 325. This disclosure contemplates that second virtual host 325 is configured to behave in a similar manner as first virtual host 210 described above, in the discussion of FIG. 2. For example, second virtual host 325 may operate as a self-contained platform, running its own operating system and software, which includes traditional authenticator 330 and connection creator 335. Accordingly, if a hacker is able to penetrate a virtual host's operating system, such penetration won't necessarily compromise the underlying actual operating system of security tool 105, stored in memory 130 and executed by processor 125. For example, if second virtual host 325 determines that user 110a has failed the authentication process (because his/her login credentials do not match those stored in second authentication server 155), security tool 105 may terminate second virtual host 325, thereby destroying any actions that user 110a may have performed on the virtual operating system.

As illustrated in FIG. 3B, the software that second virtual host 325 may run on its own operating system includes traditional authenticator 330 and connection creator 335. This disclosure contemplates that traditional authenticator 330 and connection creator 335 may be software modules stored in virtual memory 360 and executed by virtual processor 355. This disclosure further contemplates that virtual memory 360 and virtual processor 355 are themselves software modules stored in memory 130 and executed by processor 125

Traditional authenticator 330 may receive user 110a's login credentials from request 305 and send these login credentials to second authentication server 155. Second authentication server 155 may then send a response to traditional authenticator 330 indicating whether second authenticator 155 was able to authenticate user 110a for access to second subsystem 140b, based on the user's login credentials. As described above, in the discussion of FIG. 2, this disclosure contemplates that second authentication server 155 may be any appropriate authentication server for authenticating users based on login credentials. For example, in certain embodiments, second authentication server 155 may be an authentication, authorization, and accounting (AAA) server. This disclosure contemplates that second authentication server 155 may maintain an internal record or database of user profiles, each profile storing the username and password for the given user and indicating the subsystems 140a through 140n to which the user is permitted access. Accordingly, when second authentication server 155 receives a connection request 305, including a username and password for user 110a, and indicating that user 110a is seeking access to second subsystem 140b, second authentication server 155 may first determine if the submitted username and password for user 110a match those stored in the profile assigned to user 110a. If the submitted username and password match those stored in user 110a's profile, second authentication server 155 may then determine whether user 110a's profile indicates that user 110a is allowed to access second subsystem 140b. If user 110a's profile indicates that user 110a is in fact permitted to access second subsystem 140b, second authentication server 155 may send a response to second virtual host 325, indicating that second authentication server 155 has authenticated user 110a for access to second subsystem 140b.

If traditional authenticator 330 receives a response from second authentication server 155 indicating that second authentication server 155 has authenticated user 110a based on the user's login credentials, traditional authenticator 330 may instruct connection creator 335 to provide user 110a with access to second subsystem 140b. On the other hand, if second authentication server 155 fails to authenticate user 110b based on the user's login credentials, second authentication server 155 may send a response to second virtual host 325, indicating that second authentication server 155 has failed to authenticate user 110a for access to second subsystem 140b. In response to receiving a response from second authentication server 155 indicating that second authentication server 155 has failed to authenticate user 110a based on the login credentials provided by user 110a, traditional authenticator 330 may deny connection request 305. In response to traditional authenticator 330 denying connection request 305, security tool 105 may terminate first virtual host 310 (which in turn also terminates second virtual host 325).

An example of the operation of traditional authenticator 330 is as follows: (1) receive login credentials from user 110a through request 305; (2) send the login credentials to second authentication server 155; (3) receive a response from second authentication server 155 indicating either that second authentication server 155 has authenticated user 110a, based on user 110'a login credentials, or has failed to authenticate user 110a; (4) if the response indicates that second authentication server 155 has authenticated user 110a based on user 110a's login credentials, notify connection creator 335 to provide user 110a with access to second subsystem 140b; (5) if the response indicates that second authentication server 155 has failed to authenticate user 110a based on user 110a's login credentials, deny connection request 305.

As mentioned above, if traditional authenticator 330 determines that second authentication server 155 has authenticated user 110a based on the user's login credentials, traditional authenticator 330 instructs connection creator 335 to provide user 110a with access to second subsystem 140b. Connection creator 335 is configured to generate a connection between device 115a of user 110a and second subsystem 140a, such that device 115a may access data stored in second subsystem 140b, send data to second subsystem 140b, or otherwise interact with second subsystem 140b.

This disclosure contemplates that in certain embodiments, user 110a may access second subsystem 140b using a different device 115a from that which user 110a used to provide authentication string 240 to security tool 105. For example, in certain embodiments, user 110a may send connection request 305 from a first device 115a, wherein connection request 305 indicates that user 110a is seeking to access second subsystem 140b using first device 115a. Separately, a second device 115a (for example, a wearable, or other IoT device associated with user 110a) may submit an additional connection request 305, which includes authentication string 240.

An example of the operation of connection creator 335 is as follows: (1) receive an indication from traditional authenticator 330 that second authentication server has authenticated user 110a for access to second subsystem 140b; (2) determine whether device 115a is attempting to access data stored in second subsystem 140a; (3) if device 115a is attempting to access data stored in second subsystem 140b, allow device 115a to access the data; (4) determine whether device 115a is attempting to send data to second subsystem 140b; (5) if device 115a is attempting to send data to second subsystem 140b, allow device 115a to send data to second subsystem 140b.

In response to user 110a accessing second subsystem 140b, second subsystem 140b may generate a second key 340, associated with user 110a, and indicating that user 110a has accessed second subsystem 140b. This disclosure contemplates that second key 340 stores data indicating that user 110a has accessed first subsystem 140b in any suitable format. For example, in certain embodiments, second key 340 is an alpha-numeric string. As another example, in certain embodiments, second key 340 is a hash value. In certain embodiments, second key 340 is encrypted.

Second subsystem 140b may store second key 340 in database 150. In certain embodiments, database 150 is a blockchain. Second subsystem 140b may additionally split second key 340 into a first part 340a and a second part 340b. Second subsystem 140b may send first part 340a of second key 340 to user 110a for storage in authentication string 240 stored on device 115a. Second subsystem 140b may also store second part 340b of second key 340 in first authentication server 145. In certain embodiments, second subsystem 140b may additionally split second key 340 into a third part 340c and store third part 340c in third subsystem 140c. In this manner, second subsystem 140b adds to the record of user 110a's access to subsystems 140, which security tool 105 may use to further authenticate user 110a, when user 110a seeks to access subsystems 140 in the future.

This disclosure contemplates that subsystems 140a through 140n are configured to generate keys and to split these keys into any number of parts. For example, in addition to splitting second key 340 into first part 340a, second part 340b, and third part 340c, this disclosure contemplates that in certain embodiments, second subsystem 140b may be configured to split second key 340 into fourth part 340d. Second subsystem 140b may then store fourth part 340d in any appropriate location in system 100. For example, in certain embodiments, second subsystem 140b may store fourth part 340d in second subsystem 140b.

This disclosure further contemplates that in certain embodiments, a given subsystem 140a may be configured to generate a key only in response to a user 110a accessing subsystem 140a for a first time. In some embodiments, a given subsystem 140a may be configured to generate a key each time a user 110a accesses subsystem 140a. In certain such embodiments, subsystem 140a may replace the key stored in database 150 and associated with user 110a's previous access to subsystem 140a with the newly generated key. Additionally, the first part of the newly generated key may replace the first part of the key associated with user 110a's previous access to subsystem 140a and stored in user 110a's authentication string, and the second part of the newly generated key may replace the second part of the key associated with user 110a's previous access to subsystem 140a and stored in first authentication server 145. In some embodiments, a given subsystem 140a may be configured to modify a key associated with user 110a's previous access to subsystem 140a, to indicate the number of times user 110a has accessed subsystem 140a. For example, if user 110a accesses subsystem 140a for a second time, subsystem 140a may be configured to append the numeral "2" to both the first part and the second part of the key associated with user 110a's previous access to subsystem 140a, and to correspondingly modify the first part of the key stored in user 110a's authentication string, the second part of the key stored in first authentication server 145, and the complete key stored in database 150.

Given that, in certain embodiments, authentications string 240 changes after each time user 110a accesses the system (for example, a new key may be generated after user 110a accesses a new subsystem, or an existing key may be modified after user 110a accesses a subsystem he/she has previously accessed), even if a hacker is able to gain access to user 110a's authentication string 240 from a given point in time, this authentication string will likely be of limited use. This is because any subsequent system access by user 100a will result in a modified authentication string 240, such that an authentication attempt using a previous authentication string 240 (i.e. the authentication string 240 obtained by the hacker at the given point in time) will fail.

In this manner, in certain embodiments, security tool 105 may help to protect internal subsystems 140 from security threats arising from compromised login credentials, by providing an extra layer of protection in the form of an authentication string stored on a device of the user. The authentication string contains a set of partial keys, indicating those subsystems of subsystems 140a through 140n, which the user has previously accessed. When the user attempts to log into a given subsystem, in addition to authenticating the user based on his/her provided login credentials, security tool 105 authenticates the user by verifying that the set of partial keys stored in the authentication string on his/her device is consistent with the keys stored in database 150. By confirming that the user has a record of his/her previous access to subsystems 140, security tool 105 helps to ensure that the user is not simply impersonating another user, using that other user's login credentials.

c. Method of Operation of the Centrally-Located Security Tool

FIGS. 4 and 5 present flow charts illustrating the operation of security tool 105, first authentication server 145, second authentication server 155, and subsystems 140a through 140n, in response to security tool 105 receiving connection requests 160 from users 110 seeking access to a given subsystem of subsystems 140a through 140n. FIG. 4 presents a flow chart illustrating the process by which a user who has not yet accessed any of subsystems 140, is authenticated for access to first subsystem 140a, accesses first subsystem 140a, and receives a partial key in response to such access, while FIG. 5 presents a flow chart illustrating the process by which a user who has previously accessed first subsystem 140a accesses second subsystem 140b.

As illustrated in FIG. 4, in step 405, security tool 105 receives a request 205 from user 110a, indicating that user 110a is seeking access to first subsystem 140a. In response to receiving request 205, security tool launches a first virtual host 210. In step 410, security tool 105 uses first virtual host 210 to receive login credentials from user 110a and to provide the login credentials to second authentication server 155. In certain embodiments, the login credentials include a username and a password. In some embodiments, second authentication server 155 is a AAA server.

In step 415, security tool 105 uses first virtual host 210 to receive a response from second authentication server 155, from which first virtual host 210 determines whether second authentication server 155 authenticated user 110a for access to first subsystem 140a. If, in step 415, first virtual host 210 determines that second authentication server 155 did not authenticate user 110a for access to first subsystem 140a, in step 420, first virtual host 210 denies the connection request and security tool 105 terminates first virtual host 210.

On the other hand, if, in step 415, first virtual host 210 determines that second authentication server 155 did in fact authentication user 110a for access to first subsystem 140a, then, in step 425, first virtual host 210 provides user 110a with access to first subsystem 140a.

In response to user 110a accessing first subsystem 140a, in step 430, first subsystem 140a generates a first key associated with user 110a and indicating that user 110a has accessed first subsystem 140a. In step 435, first subsystem 140a stores the first key in database 150. In step 440, first subsystem 140a sends a first part of the first key to user 110a, for storage in an authentication string stored on a device 115a of user 110a. Finally, in step 445, first subsystem 140a stores a second part of the first key in first authentication server 145.

Modifications, additions, or omissions may be made to method 400 depicted in FIG. 4. Method 400 may include more, fewer, or other steps. For example, steps may be performed in parallel or in any suitable order. While discussed as security tool 105 (or components thereof) performing the steps, any suitable component of system 100, such as device(s) 115 for example, may perform one or more steps of the method.

FIG. 5 presents a flow chart illustrating the process by which security tool 105 authenticates a user 110 based on both the user's login credentials and an authentication string, where the authentication string includes a partial key, indicating that the user 110 has previously accessed first subsystem 140a.

In step 505, security tool 105 receives a request 305 from a user 110a seeking access to second subsystem 140b. In certain embodiments, request 305 contains both login credentials and an authentication string, submitted by a first device 115a of user 110a. In some embodiments, security tool 105 receives a first request 305 from a first device 115a of user 110a that includes login credentials and also receives a second request 305 from a second device 115a of user 110a, different from the first device, that includes the authentication string.

In response to receiving the request(s) 305, security tool 105 launches a first virtual host 310. In step 510, security tool 105 uses first virtual host 310 to receive the authentication string. The authentication string includes a first part of a first key and indicates that user 110a previously accessed first subsystem 140a. The first key was previously generated by first subsystem 140a in response to user 110a accessing first subsystem 140a. In response to generating the first key, first subsystem 140a sent the first part of the first key to user 110a, sent the second part of the first key to first authentication server 145, and stored the full key in database 150.

In step 515, security tool 105 uses first virtual host 310 to send the authentication string to first authentication server 145, which extracts the first part of the first key from the authentication string. In step 520, first authentication server 145 assembles a test key that includes the first part of the first key and the second part of the first key, stored in first authentication server 145.

In step 525, first authentication server 145 determines whether the test key matches the first key stored in database 150 and sends a response to first virtual host 310 indicating whether the test key matches the first key stored in database 150. In step 530, first virtual host 310 uses the response to determine whether the first authentication server 145 authenticated user 110a, based on the first key. If, in step 530, first virtual host 310 determines that first authentication server 145 failed to authenticate user 110a based on the first key, then in step 535, first virtual host 310 denies connection request 160, and security tool 105 terminates first virtual host 310.

On the other hand, if, in step 530, first virtual host 310 determines that first authentication server 145 authenticated user 110a based on the first key, first virtual host 310 launches a second virtual host 325. In step 540, security tool 105 uses second virtual host 325 to provide user 110a's provided login credentials to second authentication server 155. In step 545, second virtual host 325 uses a response received from second authentication server 155 to determine whether second authentication server 155 authenticated user 110a for access to subsystem 140b. If, in step 545, second virtual host 325 determines that second authentication server 155 failed to authenticate user 110a for access to subsystem 140b, then in step 550, second virtual host 325 denies connection request 160, and security tool 105 terminates first virtual host 310 (thereby also terminating second virtual host 325).

On the other hand, if, in step 545, second virtual host 325 determines that second authentication server 155 did, in fact authenticate user 110a for access to subsystem 140b, then in step 555, second virtual host 325 provides user 110a with access to second subsystem 140b.

In response to user 110a accessing second subsystem 140b, in step 560, second subsystem 140b generates a second key associated with user 110a and indicating that user 110a has accessed second subsystem 140b. In step 565, second subsystem 140b stores the second key in database 150. In step 570, second subsystem 140b sends a first part of the second key to user 110a, for storage in the user's authentication string, stored on a device 115a of user 110a. Finally, in step 575, second subsystem 140b stores a second part of the second key in first authentication server 145.

Modifications, additions, or omissions may be made to method 500 depicted in FIG. 5. Method 500 may include more, fewer, or other steps. For example, steps may be performed in parallel or in any suitable order. While discussed as security tool 105 (or components thereof) performing the steps, any suitable component of system 100, such as device(s) 115 for example, may perform one or more steps of the method.

II. Portable Security Tool

In certain embodiments, the above-described centrally-located security tool 105 provides enhanced security to an organization's internal network, during normal operating conditions. However, in the event of a natural disaster, or other emergency, networks may go down such that users are no longer able to authenticate through centrally located security tool 105 into the organization's internal network. At the same time, the organization may nevertheless wish to permit users to access some of its internal subsystems. For example, while users in a disaster region may be unable to authenticate into a national organization's nation-wide network, the organization may nonetheless wish to permit such users to access subsystems located at a local branch of the organization. However, without a tool to authenticate these users, such as the one described above, there may be limited safeguards to prevent unauthorized access to those sub systems.

Accordingly, this disclosure also contemplates a portable security tool that may be used in conjunction with centrally-located security tool 105. The portable security tool is configured to operate in two different modes. In a first mode of operation, the portable security tool is connected to a first system that includes centrally-located security tool 105. For example, the following discussion assumes that during the first mode of operation, the portable security tool is connected to system 100, depicted in FIGS. 1 through 3. The portable security tool is designed to lay essentially dormant, except for periodically syncing with the first system to copy and store the keys generated by the first system. In a second mode of operation, the portable security tool may be disconnected from the first system and connected to a second system. The portable security tool may then be used to authenticate users of the first system into the second system, by ensuring that their security keys match those collected from the first system. The portable security tool is described below, in the discussion of FIGS. 6 through 8.

a. System Overview

FIGS. 6 and 7 illustrate an example system 600 that includes portable security tool 605, users 110, devices 115, network 615, network 705a, network 705b, first system 100, and second system 655. Generally, in a first mode of operation and when connected to first system 100, portable security tool 605 periodically syncs with first system 100, copying the security keys stored in first system 100. For example, portable security tool 605 may copy keys 225 and 340, associated with user 110, from first system 100, as illustrated in FIG. 6. On the other hand, in a second mode of operation and when connected to second system 655, portable security tool 605 receives connection requests from devices 115, indicating that users 110 are seeking access to second system 655, authenticates these users using keys 225 and 340, and provides users 110 with access to one or more subsystems 660a through 660c of second system 655, as illustrated in FIG. 7.

Devices 115 may be used by users 110 to send connection requests 710, seeking access to second system 655, to portable security tool 605. This disclosure contemplates that connection requests 710 may include login credentials (for example, usernames and passwords), as well as authentication strings 240. For a given user 110, authentication string 240 may include one or more keys 225 and 340, generated by first system 100, in response to user 110 accessing one or more subsystems 140a through 140c of first system 100. For example, authentication string 240 may include first key 225, indicating that user 110 previously accessed first subsystem 140a of first system 100, and second key 340, indicating that user 110 previously access second subsystem 140b of first system 100. Devices 115 may also be used by users 110 to send/receive data to/from second system 655, once access to second system 655 has been granted.

Devices 115 include any appropriate device for communicating with components of first system 100 over network 615, and for communicating with components of second system 655 over network 705a. For example, devices 115 may be a telephone, a mobile phone, a computer, a laptop, a wireless or cellular telephone, a tablet, a server, and IoT device, and/or an automated assistant, among others. This disclosure contemplates devices 115 being any appropriate device for sending and receiving communications over networks 615 and 705a. Device 115 may also include a user interface, such as a display, a microphone, keypad, or other appropriate terminal equipment usable by user 110. In some embodiments, an application executed by device 115 may perform the functions described herein.

Network 615 facilitates communication between and amongst the various components of system 100, portable security tool 605, and devices 115. This disclosure contemplates network 615 being any suitable network operable to facilitate communication between such components of system 600. Network 615 may include any interconnecting system capable of transmitting audio, video, signals, data, messages, or any combination of the preceding. Network 615 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Network 705a facilitates communication between and amongst the various components of portable security tool 605 and devices 115. This disclosure contemplates network 705a being any suitable network operable to facilitate communication between the components of portable security tool 605 and devices 115. Network 705b facilitates communication between and amongst the various components of portable security tool 605 and second system 655. This disclosure contemplates network 705b being any suitable network operable to facilitate communication between the components of portable security tool 605 and second system 655. Networks 705a and 705b may include any interconnecting systems capable of transmitting audio, video, signals, data, messages, or any combination of the preceding. Networks 705a and 705b may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. Networks 705a and 705b may be the same or different networks. In certain embodiments, portable security tool 605 is configured to generate network 705a and/or network 705b. For example, in certain embodiments, portable security tool 605 is configured to generate network 705a around portable security tool 605, enabling devices within a given physical location of portable security tool 605 to communicate with the tool.

As seen in FIGS. 6 and 7, portable security tool 605 includes a processor 620, a memory 625, and an interface 630. This disclosure contemplates processor 620, memory 625, and interface 630 being configured to perform any of the functions of portable security tool 605 described herein. Generally, portable security tool 605 implements synchronization element 640 to periodically copy security keys 225 and 340 and/or login information from first system 100, authentication element 645 to authenticate users 110 seeking access to second system 655, based on keys 225 and 340, and connection creator 650 to provide users 110 with access to one or more subsystems 660a through 660c of second system 655. These features of portable security tool 605 will be described in further detail below, in Sections II.b. and II.c.

Processor 620 is any electronic circuitry, including, but not limited to microprocessors, application specific integrated circuits (ASIC), application specific instruction set processor (ASIP), and/or state machines, that communicatively couples to memory 625 and interface 630 and controls the operation of portable security tool 605. Processor 620 may be 8-bit, 16-bit, 32-bit, 64-bit or of any other suitable architecture. Processor 620 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 620 may include other hardware and software that operates to control and process information. Processor 620 executes software stored on memory to perform any of the functions described herein. Processor 620 controls the operation and administration of portable security tool 605 by processing information received from network 615, network 705a, network 705b, device(s) 115, memory 625, and interface 630. Processor 620 may be a programmable logic device, a microcontroller, a microprocessor, any suitable processing device, or any suitable combination of the preceding. Processor 620 is not limited to a single processing device and may encompass multiple processing devices.

Memory 625 may store, either permanently or temporarily, data, operational software, or other information for processor 620. Memory 625 may include any one or a combination of volatile or non-volatile local or remote devices suitable for storing information. For example, memory 625 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 625, a disk, a CD, or a flash drive. In particular embodiments, the software may include an application executable by processor 620 to perform one or more of the functions described herein.

Memory 625 may also store authentication strings 240 and login credentials 635. Portable security tool 105 obtains authentication strings 240 and/or login credentials 635 from first system 100, by accessing first system 100 and copying authentication strings 240 and/or login credentials 635 from first system 100. For each user 110, authentication string 240 includes a set of keys 225 and 340, indicating those subsystems of first system 100 to which user 110 previously accessed. For example, first key 225 may indicate that user 110 previously accessed first subsystem 140a, and second key 340 may indicate that user 110 previously accessed second subsystem 140b. Keys 225 and 340 may be generated by a system 100 that includes centrally-located security tool 105, according to the method described above, in the discussion of FIGS. 1 through 5. Additionally, this disclosure contemplates that keys 225 and 340 may include any type of security keys stored in any type of system and used to authenticate users 110 into the system.

Interface 630 represents any suitable device operable to transmit and receive information to and from networks 615, 705a, and 705b, perform suitable processing of the information, communicate to other devices, or any combination of the preceding. For example, interface 630 may be used to establish communication connections between first system 100, second system 655, and devices 115. Interface 630 represents any port or connection, real or virtual, including any suitable hardware and/or software, including protocol conversion and data processing capabilities, to communicate through a LAN, WAN, or other communication systems that allows portable security tool 605 to connect to and to exchange information with devices 115, first system 100, and second system 655. In certain embodiments, interface 630 may include one or more connectors that, when enabled, allow nearfield connections to portable security tool 605. For example, the connectors may allow Bluetooth, wireless, and/or NFC connections to portable security tool 605.

In certain embodiments, portable security tool 605 may be viewed as a "security tool in a box"—for example, portable security tool 605 may be contained in a container or similar technology. In this manner, in certain embodiments, portable security tool 605 is not only portable, but also flexible, and easy to deploy in a range of system environments.

Portable security tool 605 is connected through network 615 to first system 100. First system 100 includes first subsystem 140a, second subsystem 140b, third subsystem 140c, and database 150. Additionally, while not illustrated in FIGS. 6 and 7, this disclosure contemplates that first system 100 includes a centrally-located security tool 105, as described above in the discussion of FIGS. 1 through 5, such that first system 100 stores one or more keys 225 and 340. For example, database 150 of first system 100 stores first key 225, indicating that user 110 has previously accessed first subsystem 140a of first system 100, and second key 340, indicating that user 110 has previously accessed second subsystem 140b of first system 100. First key 225 and second key 340 may be generated by system 100, as described above in the discussion of FIGS. 2 and 3B.

Portable security tool 605 is connected through network 705b to second system 655. Second system 655 includes first subsystem 660a, second subsystem 660b, and third subsystem 660c. Subsystems 660a through 660c may be used to run projects and process requests submitted by users 110. Subsystems 660a through 660c may include processors, storage elements, application servers, database servers, file servers, mail servers, print servers, web servers, or any other type of computational resource. A project submitted to subsystems 660a through 660c may use one or more subsystems 660a through 660c when executing. When a project uses more than one subsystem 660a through 660c, communication between those servers used by the project occurs over network 705b. The computational capacity of a given subsystem of subsystems 660a through 660c depends both on its hardware and software specifications.

In certain embodiments, subsystems 660a through 660c may be separate from subsystems 140a through 140c of first system 100. In some embodiments, subsystems 660a through 660c may be a subset of the subsystems 140a through 140c of first system 100. For example, in certain embodiments, first system 100 may include subsystems 140a through 140c and subsystems 660a through 660c. During normal operations, accessing subsystems 660a through 660c may involve authenticating through centrally-located security tool 105, which is located at a different physical location than subsystems 660a through 660c. Accordingly, if a network connection to centrally-located security tool 105 goes down, authentication into subsystems 660a through 660c through centrally-located security tool 105 may not be possible. In such situations, if portable security tool 105 is located in the same general physical location as subsystems 660a through 660c (or is brought to the same general physical location as subsystems 660a through 660c), portable security tool 105 may be used to authenticate users 110 into subsystems 660a through 660c.

Different subsystems 660a through 660c may be associated with different levels of user access. For example, during normal operating conditions, all authenticated users 110 may be permitted access to first subsystem 660a and second subsystem 660b, while only a subset of authenticated users 110 may be permitted access to third subsystem 660c. Accordingly, in certain embodiments, portable security tool 605 may be configured to grant users 110 access to second system 655 based on user profiles of users 110 that indicate the subsystems of subsystems 660a through 660c, to which the users are permitted access. For example, portable security tool 605 may permit users 110 with access to certain subsystems of subsystems 660a through 660c, based on profile information captured from first system 100. On the other hand, in some embodiments, portable security tool 605 may limit the access of all users 110 to only a subset of subsystems 660a through 660c of second system 655. For example, portable security tool 605 may only permit authenticated users 110 with access to first subsystem 660a and second subsystem 660b of second system 655.

Modifications, additions, or omissions may be made to the systems described herein without departing from the scope of the invention. For example, system 600 may include any number of first systems 100, users 110, devices 115, networks 615, networks 705a, networks 705b, and second systems 655. The components may be integrated or separated. Moreover, the operations may be performed by more, fewer, or other components. Additionally, the operations may be performed using any suitable logic comprising software, hardware, and/or other logic.

b. First Mode of Operation—Syncing Security Keys from a First System

FIG. 6 illustrates the behavior of portable security tool 605, during a first mode of operation of the tool. During this first mode of operation, portable security tool 605 is connected to first system 100 through network 615. Additionally, synchronization element 640 of portable security tool 605 is active, and both of authentication element 645 and connection creator 650 are inactive. Synchronization element 640 is configured to periodically access first system 100, syncing portable security tool 605 with first system 100 by copying keys 225 and 340 and/or login credentials 635 from first system 100. Synchronization element 640 may copy keys 225 and 340 and/or login credentials 635 from first system 100 at any suitable times. For example, in certain embodiments, synchronization element 640 is configured to access first system 100 to copy keys 225 and 340 and/or login credentials 635 from first system 100 at regular time intervals. As another example, in certain embodiments, synchronization element 640 is configured to monitor first system 100, determine when a change in either keys 225 and 340 and/or login credentials 635 occurs, and copy keys 225 and 340 and/or login credentials 635, in response to determining that the change occurred.

Synchronization element 640 may be a software module stored in memory 625 and executed by processor 620. An example of the operation of synchronization element 640 is as follows: (1) determine the current time, (2) determine if the current time is a multiple of a time interval indicating the frequency by which synchronization element 640 is to access first system 100, (3) if the current time is a multiple of the time interval, access first system 100, (4) copy keys 225 and 340 and/or login credentials 635 from first system 100, and (5) store keys 225 and 340 and/or login credentials 635 in memory 625.

Apart from periodically accessing first system 100 and copying keys 225 and 340 and/or login credentials 635 from first system 100, during this first mode of operation, portable security tool 605 is configured to lay dormant such that it is essentially hidden from external users 110. As an example, during this first mode of operation, portable security tool 605 is configured not to allow any devices 115 to connect to it. For example, during this first mode of operation, the near field connection generating capabilities of interface 630 are disabled. In this manner, portable security tool 605 may limit its susceptibility to security intrusions.

c. Second Mode of Operation—Authentication using the Security Keys Captured from the First System In certain embodiments, portable security tool 605 is configured to switch to a second mode of operation in response to receiving information 665 associated with an event. This disclosure contemplates that the event could be any type of event such that certain users 110 may no longer be able to access first system 100 by authenticating through centrally-located security tool 105 of first system 100. For example, the event may be associated with one or more networks going down, such that user 110 is no longer able to access centrally-located security tool 105. The event may be a natural disaster such as an earthquake or a flood, or any other event such that one or more networks 615 goes down. The information 665 associated with the event may be any suitable information indicating to portable security tool 605 that the tool is to switch from the first mode of operation to a second mode of operation. As an example, in certain embodiments, information 665 may be transmitted to portable security tool 605 from one or more sensors connected to portable security tool 605. For example, information 665 may indicate that ground vibrations have exceeded a given threshold, such that an earthquake may have occurred, or that a water level has exceeded a threshold, such that flooding may have occurred. As another example, in some embodiments, information 665 may be associated with a lack of information received from portable security tool 605. For example, portable security tool 605 may be configured to periodically ping first system 100, to determine that first system 100 is reachable. If portable security tool 605 does not receive a response from first system 100 within a set period of time, portable security tool 605 may determine that first system 100 is no longer reachable, such that portable security tool 605 should switch to its second mode of operation. As a further example, in certain embodiments, information 665 may include information received from a system administrator. For example, information 665 may include a command entered by a system administrator instructing portable security tool 605 to switch to its second mode of operation, and/or information associated with a step taken by a system administrator to disconnect portable security tool 605 from first system 100.

In response to receiving information 665 associated with the event, portable security tool 605 is configured to switch to its second mode of operation. Accordingly, portable security tool 605 may disconnect from first system 100 and to connect to second system 655. FIG. 7 illustrates the behavior of portable security tool 605, during this second mode of operation. As illustrated in FIG. 7, during the second mode of operation, portable security tool 605 is connected to second system 655 through network 705b. Portable security tool 605 is also connected to devices 115 through network 705a. Network 705a may be generated by portable security tool 605 to allow users 110 to connect to the tool. For example, interface 630 of portable security tool 605 may include one or more connectors, which, when enabled, allow nearfield connections to portable security tool 605. For example, the connectors may allow Bluetooth, wireless, and/or NFC connections to portable security tool 605.

During the second mode of operation of portable security tool 605, synchronization element 640 may be disabled, while authentication element 645 and connection creator 650 may be enabled. This disclosure contemplates that during the second mode of operation, one or more networks may be down, such that users 110 are unable to access second system 655 through normal channels. For example, in certain embodiments, subsystems 660a through 660c of second system 655 may be a subset of first system 100. During and/or after the event, users 110 may not be able to authenticate into first system 100 through centrally-located security tool 105, because this tool may be unreachable. Accordingly, portable security tool 605 may be used to provide users 110 with access to subsystems 660a through 660c. In certain embodiments, portable security tool 605 may be located in the same general location as second system 655 such that providing users 110 with access to second system 655 may be accomplished by generating a local network 705a and/or 705b around this general location.

During its second mode of operation, before providing users 110 with access to second system 655, portable security tool 605 is configured to authenticate users 110, using authentication element 645. Authentication element 645 receives connection requests 710 from users 110 seeking access to second system 655. This disclosure contemplates that portable security tool 105 may be separate from subsystems 660a through 660c, such that authentication element 645 may authenticate users 110, without yet providing devices 115, associated with users 110, with access to any of subsystems 660a through 660c. In certain embodiments, authentication element 645 may be configured to generate a virtual host to authenticate user 110, in a similar manner as described above, in the context of centrally-located security tool 105, as discussed with regard to FIGS. 2 and 3A. The use of a virtual host may be desirable, because the virtual host may function as a self-contained platform, running its own operating system and software. Accordingly, if a hacker is able to penetrate the virtual host's operating system, such penetration won't necessarily compromise the underlying actual operating system of portable security tool 605, stored in memory 625 and executed by processor 620. For example, if the virtual host determines that user 110 has failed the authentication process, portable security tool 605 may terminate the virtual host, thereby destroying any actions that user 110 may have performed on the virtual operating system.

Connection request 710 may include or be accompanied with authentication string 240 and/or login credentials 635. Authentication element 645 is configured to (1) compare the keys included in authentication string 240 with the keys 225 and 340 stored in memory 625, and/or (2) compare the received login credentials with the login credentials 635 stored in memory 625. In embodiments in which connection request 710 includes (or is accompanied with) authentication string 240 but not login credentials 635, authentication element 645 is configured to authenticate user 110 in response to determining that the keys included in authentication string 240 are consistent with the keys 225 and 340 stored in memory 625. On the other hand, authentication element 645 is configured to deny connection request 710, in response to determining that the keys included in authentication string 240 are inconsistent with the keys 225 and 340 stored in memory 625. In embodiments in which connection request 710 includes (or is accompanied with) login credentials 635 but not authentication string 240, authentication element 645 is configured to authenticate user 110 in response to determining that the login credentials provided by user 110 match the login credentials 635 stored in memory 625. Here, login credentials 635 may include a username and password for user 100. Authentication element 645 is also configured to deny connection request 710, in response to determining that the login credentials provided by user 110 do not match the login credentials 635 stored in memory 625. In embodiments in which connection request 710 includes (or is accompanied with) both authentication string 240 and login credentials, authentication element 645 is configured to authenticate user 110 in response to determining both that the keys included in authentication string 240 are consistent with the keys 225 and 340 stored in memory 625 and that the login credentials provided by user 110 match the login credentials 635 stored in memory 625. On the other hand, authentication element 645 is configured to deny connection request 710, in response to determining either that the keys included in authentication string 240 are inconsistent with the keys 225 and 340 stored in memory 625, or that the login credentials provided by user 110 do not match the login credentials 635 stored in memory 625.

In certain embodiments, authentication string 240 may include partial keys, as described above, in the discussion of FIGS. 1 through 5. In such embodiments, determining that the keys included in authentication string 240 are consistent with the keys 225 and 340 stored in memory 625 may include determining that the partial keys match a portion of the keys 225 and 340 stored in memory 625. In some embodiments, authentication string 240 may include full keys. In such embodiments, determining that the keys included in authentication string 240 are consistent with the keys 225 and 340 stored in memory 625 includes determining that the full keys included in authentication string 240 may keys 225 and 340 stored in memory 625.

Authentication element 645 may be a software module stored in memory 625 and executed by processor 620. An example of the operation of authentication element 645 is as follows: (1) receive a connection request 710 from user 110, (2) determine if the keys included in authentication string 240 are consistent with the keys 225 and 340 stored in memory 625, (3) if the keys included in authentication string 240 are inconsistent with the keys 225 and 340 stored in memory 625, deny connection request 710, (4) if the keys included in authentication string 240 are consistent with the keys 225 and 340 stored in memory 625, determine if the login credentials provided by user 110 are consistent with the login credentials stored in memory 625, (5) if the login credentials provided by user 110 are inconsistent with the login credentials 635 stored in memory 625, deny connection request 710, (6) if the login credentials provided by user 110 are consistent with the login credentials 635 stored in memory 625, authenticate user 110.

In response to authenticating user 110, authentication element 645 is configured to direct connection creator 650 to provide user 110 with access to one or more subsystems 660a through 660c of second system 655. In certain embodiments, connection creator 650 is configured to provide user 110 with access to all of subsystems 660a through 660c. In some embodiments, connection creator 650 is configured to provide user 110 with access to only a subset of subsystems 660a through 660c. For example, connection creator 650 may be configured to provide user 110 with access to first subsystem 660a, but not to second subsystem 660b and third subsystem 660c. The subset of subsystems 660a through 660c to which user 110 is provided access may be determined based on the subsystems 140a through 140c of first system 100, to which user 110 previously accessed. For example, in embodiments in which subsystems 660a through 660c are a subset of subsystems 140 of first system 100, connection creator 650 may provide user 110 with access to only those subsystems 660a through 660c to which authentication string 240 indicates that user 110 previously accessed. As another example, connection creator 650 may provide user 110 with access to only those subsystems 660a through 660c that are associated with a similar level of access control as the subsystems 140 of first system 100, to which user 110 previously accessed. For example, authentication string 240 may indicate that user 110 previously accessed first subsystem 140a and second subsystem 140b of first system 100, to which all authenticated users are permitted access. Accordingly, connection creator 650 may limit user 110's access to second system 655 to only those subsystems 660a through 660c to which authenticated users are universally permitted access. As another example, authentication string 240 may indicate that user 110 previously accessed all of subsystems 140a through 140c of first system 100. Accordingly, connection creator 650 may provide user 110 with access to all of subsystems 660a through 660c under the assumption that user 110 is a trusted user.

In some embodiments, connection creator 650 may be configured to provide users 110 with access to only a predetermined subset of subsystems 660a through 660c, which is the same for all users 110. For example, in the event of a natural disaster, portable security tool 605 may be configured to provide users 110 with access only to those subsystems of subsystems 660a through 660c that are of immediate importance to users 110. As an example, if second system 655 corresponds to components of a financial institution, users 110 may be provided access to subsystems associated with accessing account funds, but not with subsystems associated with mortgage applications. This may be desirable to provide users 110 with important services, while nonetheless limiting the susceptibility of second system 655 to attacks from bad actors. In certain embodiments, the subsystems 660 of second system 655 to which users 110 are provided access may change over time. For example, connection creator 650 may include an intelligence configured to learn from access patterns and to determine timings when it may be desirable to provide users 110 with access to additional subsystems.

Connection creator 650 may be a software module stored in memory 625 and executed by processor 620. An example of the operation of connection creator 650 is as follows: (1) receive information from authentication element 645 indicating that authentication element 645 has authenticated user 110 for access to second system 655, (2) provide user 110 with access to a predetermined subset of subsystems 660a through 660c.

d. Method of Operation of the Portable Security Tool

FIG. 8 presents a flowchart illustrating the process by which portable security tool 605 first syncs with first system 100, copying users' security keys from first system 100, and then connects to second system 655 to provide authentication services to second system 655. In step 805, portable security tool 605 connects to first system 100, and enters a first mode of operation. In step 810, portable security tool 605 obtains one or more keys 225 and 340 from first system 100. Keys 225 and 340 indicate the locations in first system 100 previously accessed by user 110. For example, first key 225 indicates that user 110 previously accessed first subsystem 140a of first system 100 and second key 340 indicates that user 110 previously accessed second subsystem 140b of first system 100. Portable security tool 605 is configured to obtain security keys 225 and 340 at any suitable times. For example, in certain embodiments, portable security tool 605 obtains security keys 225 and 340 at regular time intervals.

In step 815, portable security tool 605 disconnects from first system 100. For example, in certain embodiments, portable security tool 605 may disconnect from first system 100 in response to receiving information associated with an event. The event may include a natural disaster, such as an earthquake or a flood, or any other event that may indicate that users 110 are no longer able to access first system 100 by authenticating through centrally-located security tool 105. Portable security tool 605 may also disconnect from first system 100 as a result of a system administrator disconnecting portable security tool 605 from first system 100.

In step 820, portable security tool 605 connects to a second system 655, and enters a second mode of operation, to provide authentication services to second system 655. In step 825, portable security tool 605 receives a request 710 indicating that a user 110 is seeking access to second system 655. In step 830, portable security tool 605 receives an authentication string 240 from user 110. In step 835, portable security tool 605 determines if authentication string 240 includes the one or more keys 225 and 340 obtained from first system 100. If, in step 835, portable security tool 605 determines that authentication string 240 does not include keys 225 and 340, in step 840, portable security tool 605 denies connection request 710. On the other hand, if, in step 835, portable security tool 605 determines that authentication string 240 does include keys 225 and 340, in step 845 portable security tool 605 provides user 110 with access to second system 655. Here, providing user 110 with access to second system 655 may include providing user 110 with access to only a subset of subsystems 660a through 660c of second system 655.

Modifications, additions, or omissions may be made to method 800 depicted in FIG. 8. Method 800 may include more, fewer, or other steps. For example, steps may be performed in parallel or in any suitable order. While discussed as portable security tool 605 (or components thereof) performing the steps, any suitable component of system 600, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
a memory; and
a hardware processor communicatively coupled to the memory, the hardware processor configured to,
during a first mode of operation:
obtain a first key and a second key from a first system, the first key indicating that a user previously accessed a first subsystem of the first system, the second key indicating that the user previously accessed a second subsystem of the first system; and
during a second mode of operation:
receive information associated with an event, the information comprising at least
receive a request indicating that the user is seeking to access a second system;
perform an authentication of the user, without yet connecting the user to the second system, wherein performing the authentication comprises:
receiving an authentication string from the user, the authentication string comprising a first user key and a second user key;
determining that the first user key matches the first key; and
determining that the second user key matches the second key;
and
in response to performing the authentication of the user, provide the user with access to the second system.

2. The apparatus of claim 1, wherein the first mode of operation occurs at a first physical location and the second mode of operation occurs at a second physical location, the second physical location different from the first physical location.

3. The apparatus of claim 1, wherein the hardware processor is further configured to, during the first mode of operation, obtain the first key and the second key at regular intervals from the first system.

4. The apparatus of claim 1, wherein the hardware processor is configured to enter the second mode of operation in response to:
transmitting data to the first system; and
in response to transmitting the data, failing to receive an acknowledgement from the first system within a set period of time.

5. The apparatus of claim 1, wherein:
the hardware processor is further configured, during the first mode of operation, to obtain login credentials from the first system, the login credentials belonging to the user and comprising a username and a password; and
performing the authentication of the user further comprises:
receiving login credentials from the user; and
determining that the login credentials received from the user match the login credentials obtained from the first system.

6. The apparatus of claim 5, wherein the hardware processor is further configured to, during the second mode of operation:
receive a second request indicating that a second user is seeking to access the second system, the second user attempting to use the login credentials from the first user to access the second system;
in response to receiving the second request:
receive the login credentials and a second authentication string from the second user, without yet connecting the second user to the second system;
determine that the second authentication string does not comprise the first key; and in response to determining that the second authentication string does not comprise the first key, deny the second request.

7. The apparatus of claim 1, wherein:
the second system comprises one or more subsystems; and
providing the user with access to the second system comprises providing the user with access to a subset of the one or more subsystems, wherein the subset of the one or more subsystems is predefined.

8. A method comprising,
during a first mode of operation:
obtaining a first key and a second key from a first system, the first key indicating that a user previously accessed a first subsystem of the first system, the second key indicating that the user previously accessed a second subsystem of the first system; and
during a second mode of operation:
receiving a request indicating that the user is seeking to access the second system;
performing an authentication of the user, without yet connecting the user to the second system, wherein performing the authentication comprises:
receiving an authentication string from the user, the authentication string comprising a first user key and a second user key;
determining that the first user key matches the first key; and
determining that the second user key matches the second key; and
in response to performing the authentication of the user, providing the user with access to the second system.

9. The method of claim 8, wherein the first mode of operation occurs at a first physical location and the second mode of operation occurs at a second physical location, the second physical location different from the first physical location.

10. The method of claim 8, further comprising, during the first mode of operation, obtaining the first key and the second key at regular intervals from the first system.

11. The method of claim 8, wherein entering the second mode of operation occurs in response to:
transmitting data to the first system; and
in response to transmitting the data, failing to receive an acknowledgement from the first system within a set period of time.

12. The method of claim 8, further comprising, during the first mode of operation, obtaining login credentials from the first system, the login credentials belonging to the user and comprising a username and a password, wherein performing the authentication of the user further comprises:
receiving login credentials from the user; and
determining that the login credentials received from the user match the login credentials obtained from the first system.

13. The method of claim 12, further comprising, during the second mode of operation:
receiving a second request indicating that a second user is seeking to access the second system, the second user attempting to use the login credentials from the first user to access the second system;
in response to receiving the second request:
receiving the login credentials and a second authentication string from the second user, without yet connecting the second user to the second system;
determining that the second authentication string does not comprise the first key; and
in response to determining that the second authentication string does not comprise the first key, denying the second request.

14. The method of claim 8, wherein providing the user with access to the second system comprises providing the user with access to a subset of one or more subsystems of the second system, wherein the subset of the one or more subsystems is predefined.

15. A system comprising:
a first subsystem;
a second subsystem;
a storage element; and
a processing element communicatively coupled to the storage element, the processing element operable to,
during a first mode of operation:
obtain a first key and a second key from the first subsystem, the first key indicating that a user previously accessed a first part of the first subsystem, the second key indicating that the user previously accessed a second part of the first subsystem; and
during a second mode of operation:
receive a request indicating that the user is seeking to access the second subsystem;
perform an authentication of the user, without yet connecting the user to the second subsystem, wherein performing the authentication comprises:
receiving an authentication string from the user, the authentication string comprising a first user key and a second user key;
determining that the first user key matches the first key; and
determining that the second user key matches the second key;
and
in response to performing the authentication of the user, provide the user with access to the second subsystem.

16. The system of claim 15, wherein the first mode of operation occurs at a first physical location and the second mode of operation occurs at a second physical location, the second physical location different from the first physical location.

17. The system of claim 15, wherein the processing element is further operable to, during the first mode of operation, obtain the first key and the second key at regular intervals from the first system.

18. The system of claim 15, wherein the processing element is operable to enter the second mode of operation in response to:
transmitting data to the first subsystem; and
in response to transmitting the data, failing to receive an acknowledgement from the first subsystem within a set period of time.

19. The system of claim 15, wherein:
the processing element is further operable to, during the first mode of operation, obtain login credentials from the first subsystem, the login credentials belonging to the user and comprising a username and a password; and
performing the authentication of the user further comprises:
receiving login credentials from the user; and
determining that the login credentials received from the user match the login credentials obtained from the first subsystem.

20. The system of claim 19, wherein the processing element is further operable to, during the second mode of operation:
- receive a second request indicating that a second user is seeking to access the second subsystem, the second user attempting to use the login credentials from the first user to access the second subsystem;
- in response to receiving the second request:
  - receive the login credentials and a second authentication string from the second user, without yet connecting the second user to the second subsystem;
  - determine that the second authentication string does not comprise the first key;

and
- in response to determining that the second authentication string does not comprise the first key, deny the second request.

* * * * *